(12) United States Patent
Lee et al.

(10) Patent No.: US 11,036,273 B2
(45) Date of Patent: Jun. 15, 2021

(54) MEMORY SYSTEM AND OPERATING METHOD THEREOF

(71) Applicant: SK hynix Inc., Gyeonggi-do (KR)

(72) Inventors: Dong Sop Lee, Gyeonggi-do (KR); In Jae Yoo, Gyeonggi-do (KR); Dong Yeob Chun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/113,698

(22) Filed: Aug. 27, 2018

(65) Prior Publication Data

US 2019/0212932 A1    Jul. 11, 2019

(30) Foreign Application Priority Data

Jan. 11, 2018 (KR) .................. 10-2018-0004023

(51) Int. Cl.
*G06F 1/3225* (2019.01)
*G06F 3/06* (2006.01)
*G06F 1/28* (2006.01)

(52) U.S. Cl.
CPC .............. *G06F 1/3225* (2013.01); *G06F 1/28* (2013.01); *G06F 3/0625* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 5,894,579 | A  | * | 4/1999  | Fujihara .................. G06F 1/26 713/324 |
| 8,429,436 | B2 | * | 4/2013  | Fillingim ............... G11C 5/141 711/100 |
| 9,063,732 | B2 |   | 6/2015  | Byom et al. |
| 9,880,605 | B2 | * | 1/2018  | Thangaraj ............. G06F 1/3268 |
| 10,025,367 | B2 | * | 7/2018  | Kaburlasos ........... G06F 1/3234 |
| 2012/0192003 | A1 | * | 7/2012 | Akiyama ............. G06F 11/3072 713/340 |
| 2013/0311707 | A1 | * | 11/2013 | Kawamura ......... G06F 12/0246 711/103 |
| 2014/0112079 | A1 |   | 4/2014 | Wakrat et al. |

FOREIGN PATENT DOCUMENTS

KR    10-2005-0095794 A    10/2005
KR    1020170035320       3/2017

* cited by examiner

*Primary Examiner* — Charles J Choi
(74) *Attorney, Agent, or Firm* — IP & T Group LLP

(57) ABSTRACT

There are provided a memory system and an operating method thereof. A memory system includes a plurality of memory devices for performing operations, a power consumption profile table storing section for storing a power consumption profile table of power consumption values with respect to times when the memory devices perform the operations, and a processor for deriving a total power consumption value for the plurality of memory devices based on the power consumption profile table, and determining whether to release or hold a queued command based on the derived total power consumption value.

15 Claims, 12 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0004023, filed on Jan. 11, 2018, which is incorporated herein by reference in its entirety.

BACKGROUND

1. Field of Invention

Various embodiments of the present disclosure relate to a memory system and an operating method thereof. Particularly, the embodiments relate to a memory system and operating method thereof from which the memory controller can determine whether a queued command is to be performed or held based on power consumption amounts of nonvolatile memory devices.

2. Description of Related Art

A nonvolatile memory device may include a plurality of memory blocks. In addition, each memory block may include a plurality of memory cells, and an erase operation may be performed simultaneously on memory cells in one memory block.

When a read operation, a program operation, or an erase operation is performed, the nonvolatile memory device consumes power, the amount of which varies depending on a performance time. As an example, when the read operation is performed, the power consumption amount of the nonvolatile memory may increase at the beginning and then decrease after a certain time elapses.

A memory system may include a plurality of nonvolatile memory devices. Accordingly, it is necessary for the memory system to control total power consumption of such devices to be a certain level or less. A high peak power consumption in the memory system may deteriorate the reliability of the memory system.

SUMMARY

Embodiments provide a memory system for releasing or holding a queued command according to power consumption of nonvolatile memory devices, and an operating method thereof.

According to an aspect of the present disclosure, there is provided a memory system including a plurality of memory devices configured to perform operations, a power consumption profile table storing section configured to store a power consumption profile table of power consumption values with respect to times when the memory devices perform the operations, and a processor configured to derive a total power consumption value for the plurality of memory devices based on the power consumption profile table, and determine whether to release or hold a queued command based on the derived total power consumption value.

According to an aspect of the present disclosure, there is provided a method for operating a memory system including deriving a total power consumption value by summing up power consumption values for memory devices that perform operations based on a table representing power consumption values with respect to times of the operations, deriving a power consumption remaining value by subtracting the total power consumption value from a maximum power budget, comparing peak power values of the operations with the power consumption remaining value, and determining whether a command scan operation of scanning queued commands is to be performed or held based on the compared result.

According to an aspect of the present disclosure, there is provided a memory system including a plurality of nonvolatile memory devices configured to perform operations, a power consumption profile table storing section configured to store power consumption profile tables for the operations, a flash power consumption management section configured to derive power consumption values for the nonvolatile memory devices, based on the power consumption profile tables corresponding to the operations performed by the nonvolatile memory devices, a power consumption sum-up section configured to derive a total power consumption value by summing up the power consumption values, and a command scheduler configured to determine whether to release or hold a queued command by comparing peak power values of the operations with the total power consumption value.

According to an aspect of the present disclosure, there is provided a memory system including a plurality of memory devices, and a controller configured to control the memory devices to perform operations, wherein the controller includes a plurality of power consumption tables having power consumption information of the operations pre-measured at set intervals, respectively, wherein the controller releases or holds queued commands for subsequent operations based on power consumption of the memory system calculated through the power consumption tables and times of current operations.

BRIEF DESCRIPTION OF THE DRAWINGS

Various embodiments will now be described more fully with reference to the accompanying drawings; however, elements and features of the present disclosure may be configured or arranged differently than shown or described herein. Thus, the present invention is not limited to the embodiments set forth herein. Rather, these embodiments are provided so that this disclosure is thorough and complete and fully conveys the scope of the embodiments to those skilled in the art.

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, embodiments of the present disclosure are shown and described simply by way of example. As those skilled in the art would realize, the described embodiments may be modified in various different ways, all without departing from the spirit or scope of the present disclosure. Accordingly, the drawings and description are to be regarded as illustrative in nature and not restrictive. Moreover, throughout the specification, reference to "an embodiment" or the like is not necessarily to only one embodiment, and different references to "an embodiment" or the like are not necessarily to the same embodiment(s).

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components rather than excluding such component(s), unless the context indicates otherwise.

Figure 1:
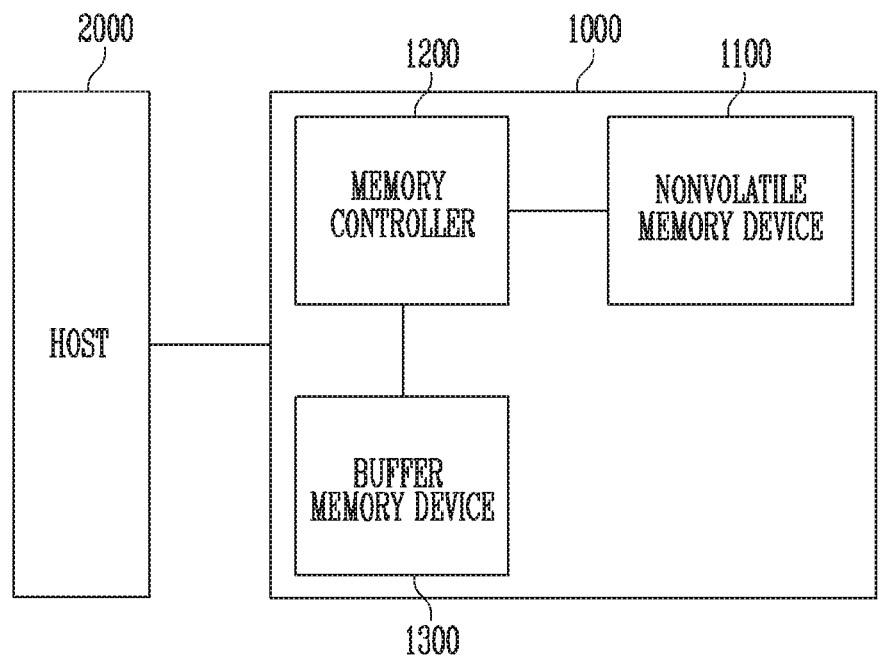
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a nonvolatile memory device 1100 that retains stored data even when power is cut off, a buffer memory device 1300 for temporarily storing data, and a memory controller 1200 for controlling the nonvolatile memory device 1100 and the buffer memory device 1300 under the control of a host 2000.

The host 2000 may communicate with the memory system 1000, using at least one of various communication manners, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI Express (PCIe), a NonVolatile Memory Express (NVMe), a Universal Flash Storage (UFS), a Secure Digital (SD), a MultiMedia card (MMC), an Embedded MMC (eMMC), a Dual In-line Memory Module (DIMM), a Registered DIMM (RDIMM), a Load Reduced DIMM (LRDIMM), and the like.

The memory controller 1200 may control overall operations of the memory system 1000, and control data exchange between the host 2000 and the nonvolatile memory device 1100. For example, the memory controller 1200 may program or read data by controlling the nonvolatile memory device 1100 in response to a request of the host 2000. Also, the memory controller 1200 may store information of main memory blocks and sub-memory blocks, which are included in the nonvolatile memory device 1100, and select the nonvolatile memory device 1100 to perform a program operation on a main memory block or a sub-memory block according to the amount of data loaded for the program operation. In some embodiments, the nonvolatile memory device 1100 may include a flash memory.

The memory controller 1200 may control data exchange between the host 2000 and the buffer memory device 1300 or temporarily store system data for controlling the nonvolatile memory device 1100 in the buffer memory device 1300. The buffer memory device 1300 may be used as a working memory, a cache memory or a buffer memory of the memory controller 1200. The buffer memory device 1300 may store codes and commands, which are performed by the memory controller 1200. Also, the buffer memory device 1300 may store data processed by the memory controller 1200.

The memory controller 1200 may temporarily store data input from the host 200 in the buffer memory device 1300 and then transmit such data to the nonvolatile memory device 1100 to be stored therein. Also, the memory controller 1200 may receive data and a logical address, which are input from the host 2000, and translate the logical address to a physical address indicating an area in which data is to be actually stored in the nonvolatile memory device 1100. Also, the memory controller 1200 may store, in the buffer memory 1300, a logical-to-physical address mapping table that establishes a mapping relationship between the logical address and the physical address.

In some embodiments, the buffer memory device 1300 may include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), etc.

In some embodiments, the memory system 1000 may not include the buffer memory device 1300, which may be provided separately or its functions distributed to one or more other components of the memory system 1000.

Figure 2:
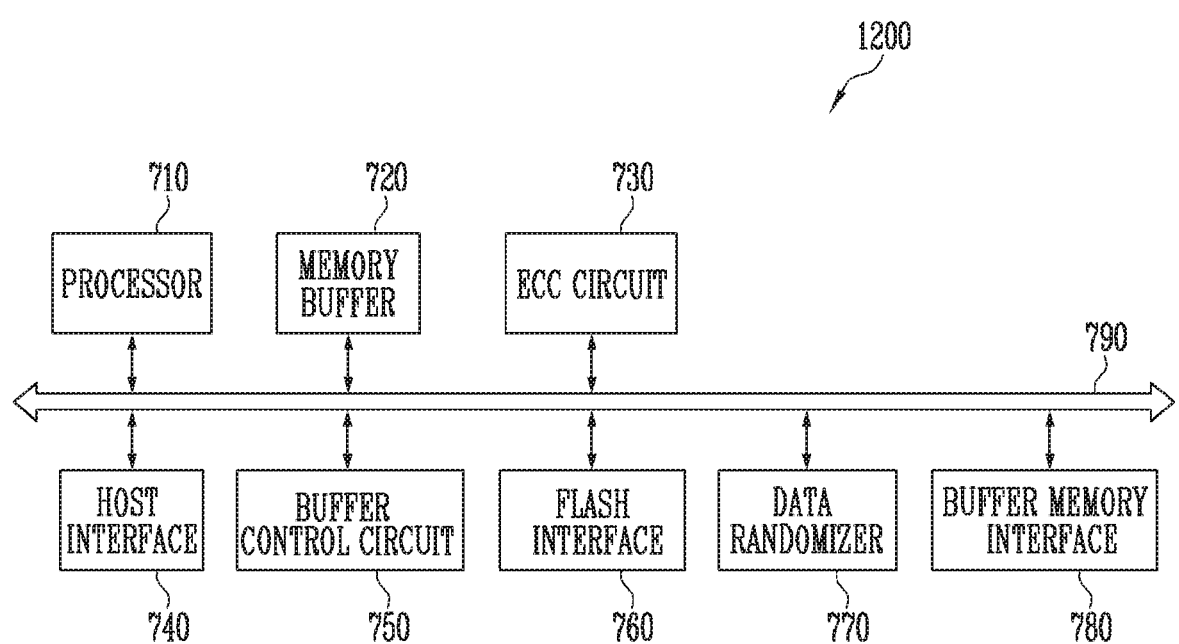
FIG. 2 is a diagram illustrating a memory controller of FIG. 1.

FIG. 2 is a diagram illustrating the memory controller of FIG. 1.

Referring to FIG. 2, the memory controller 1200 may include a processor 710, a memory buffer 720, an error correction code (ECC) circuit 730, a host interface 740, a buffer control circuit 750, a flash interface 760, a data randomizer 770, a buffer memory interface 780, and a bus 790.

The bus 790 may be configured to provide channels between components of the memory controller 1200.

The processor 710 may control overall operations of the memory controller 1200, and perform a logical operation. The processor 710 may communicate with the external host 2000 through the host interface 740, and communicate with the nonvolatile memory device 1100 through the flash interface 760. Also, the processor 710 may communicate with the buffer memory device 1300 through the buffer memory interface 780. Also, the processor 710 may control the memory buffer 720 through the buffer control circuit

750. The processor 710 may control an operation of the memory system 1000 by using the memory buffer 720 as a working memory, a cache memory or a buffer memory.

The processor 710 may queue a plurality of commands input from the host 2000. Such an operation is referred to as a multi-queue. The processor 710 may sequentially transfer the plurality of queued commands to the nonvolatile memory device 1100.

The memory buffer 720 may be used as the working memory, the cache memory or the buffer memory of the processor 710. The memory buffer 720 may store codes and commands, which are performed by the processor 710. The memory buffer 720 may store data processed by the processor 710. The memory buffer 720 may include a Static RAM (SRAM) or a Dynamic RAM (DRAM).

The ECC circuit 730 may perform error correction. The ECC circuit 730 may perform ECC encoding on data to be written in the nonvolatile memory device 1100 through the flash interface 760. The ECC-encoded data may be transferred to the nonvolatile memory device 1100 through the flash interface 760. The ECC circuit 730 may perform ECC decoding on data received from the nonvolatile memory device 1100 through the flash interface 760. As an example, the ECC circuit 730 may be included as a component of the flash interface 760 in the flash interface 760.

The host interface 740 is configured to communicate with the external host 2000 under the control of the processor 710. The host interface 740 may be configured to communicate with the host 2000, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Nonvolatile Memory Express (NVMe), a Universal Flash Storage (UFS), a Secure Digital (SD), a MultiMedia Card (MMC), an Embedded MMC (eMMC), a Dual In-line Memory Module (DIMM), a Registered DIMM (RDIMM), and a Load Reduced DIMM (LRDIMM).

The buffer control circuit 750 is configured to control the memory buffer 720 under the control of the processor 710.

The flash interface 760 is configured to communicate with the nonvolatile memory device 1100 under the control of the processor 710. The flash interface 760 may communicate a command, an address, and data with the nonvolatile memory device 1100 through a channel.

As an example, the memory controller 1200 may not include the memory buffer 720 and the buffer control circuit 750. In such embodiment, the memory buffer 720 and/or the buffer control circuit 750 may be provided separately or the functions of one or both may be distributed within the memory controller 1200.

As an example, the processor 710 may control an operation of the memory controller 1200 by using codes. The processor 710 may load codes from a nonvolatile memory device (e.g., a read only memory (ROM)) provided in the memory controller 1200. As another example, the processor 710 may load codes from the nonvolatile memory device 1100 through the flash interface 760.

The data randomizer 770 may randomize data or de-randomize the randomized data. The data randomizer 770 may perform a data randomizing operation on data to be written in the nonvolatile memory device 1100 through the flash interface 760. The randomized data may be transferred to the nonvolatile memory device 1100 through the flash interface 760. The data randomizer 770 may perform a data de-randomizing operation on data received from the nonvolatile memory device 1100 through the flash interface 760.

As an example, the data randomizer 770 may be included as a component of the flash interface 760.

As an example, the bus 790 of the memory controller 1200 may be divided into a control bus and a data bus. The data bus may be configured to transmit data in the memory controller 1200, and the control bus may be configured to transmit control information such as a command and an address in the memory controller 1200. The data bus and the control bus are separated from each other, and may not interfere or influence with each other. The data bus may be coupled to the host interface 740, the buffer control circuit 750, the ECC circuit 730, the flash interface 760, and the buffer memory interface 780. The control bus may be coupled to the host interface 740, the processor 710, the buffer control circuit unit 750, the flash interface 760, and the buffer memory interface 780. In some embodiments, the memory controller 1200 may not include the buffer memory interface 780, which may be provided separately or its functions distributed within the memory controller 1200.

The buffer memory interface 780 may be configured to communicate with the buffer memory device 1300 under the control of the processor 710. The buffer memory interface 780 may communicate a command, an address, and data with the buffer memory device 1300 through a channel.

Figure 3:
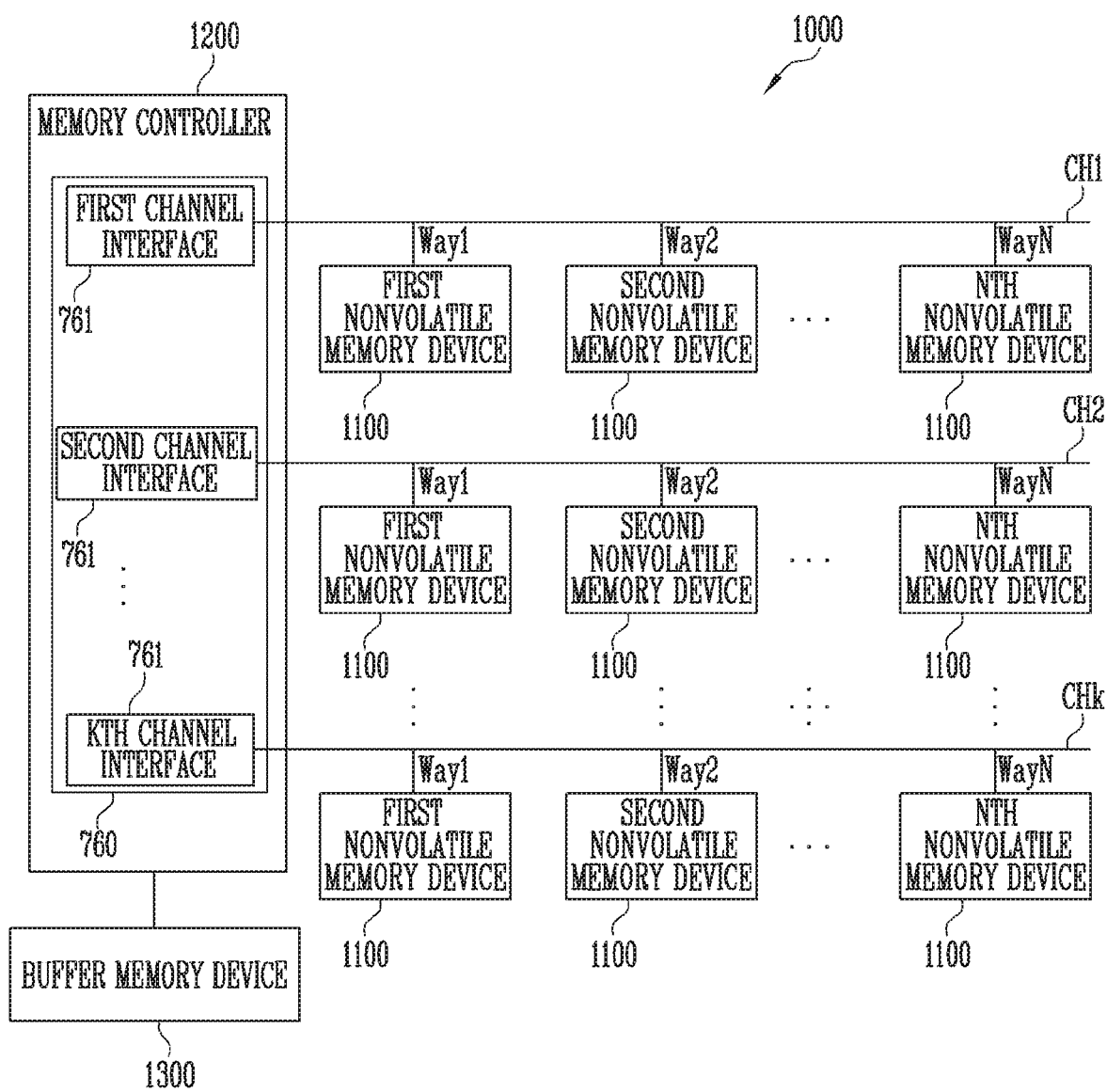
FIG. 3 is a diagram illustrating a memory system according to another embodiment of the present disclosure.

FIG. 3 is a diagram illustrating a memory system according to another embodiment of the present disclosure. FIG. 3 illustrates a memory system 1000 including a plurality of nonvolatile memory devices 1100 coupled to a memory controller 1200 through a plurality of channels CH1 to CHk. A flash interface 760 may include first to kth channel interfaces 761 corresponding to the plurality of channels CH1 to CHk.

Referring to FIG. 3, the memory controller 1200 may communicate with the plurality of nonvolatile memory devices 1100 through the plurality of channels CH1 to CHk. Each of the plurality of channels CH1 to CHk may be coupled to a respective one of the plurality of channel interfaces 761. As an example, a first channel CH1 may be coupled to a first channel interface 761, a second channel CH2 may be coupled to a second channel interface 761, and a kth channel CHk may be coupled to a kth channel interface 761. Each of the plurality of channels CH1 to CHk may be coupled to one or more nonvolatile memory devices 1100. In addition, nonvolatile memory devices 1100 coupled to different channels may operate independently from each other. In other words, a nonvolatile memory device 1100 coupled to the first channel CH1 and a nonvolatile memory device 1100 coupled to the second channel CH may operate independently from each other. As an example, the memory controller 1200 may communicate, in parallel, data or a command with the nonvolatile memory device 1100 coupled to the second channel CH2 through the second channel CH2 while communicating data or a command with the nonvolatile memory device 1100 coupled to the first channel CH1 through the first channel CH1.

Each of the plurality of channels CH1 to CHk may be coupled to a plurality of nonvolatile memory devices 1100. A plurality of nonvolatile memory devices 1100 coupled to one channel may constitute different ways, e.g., Way1, Way2, . . . , WayN, where N represents the number of nonvolatile memory devices 1100 coupled to one channel. That is, first to Nth nonvolatile memory devices 1100 may be coupled to the first channel CH1 to constitute a first way Way1, a second way Way2, up to an Nth way WayN. Alternatively, unlike the configuration shown in FIG. 3, two or more nonvolatile memory devices 1100 on the same channel may constitute one way Way.

Since the first to Nth nonvolatile memory devices 1100 coupled to the first channel CH1 share the first channel CH1, such nonvolatile memory devices 1100 may not simultaneously communicate data or a command with the memory controller 1200 but may sequentially communicate data or a command with the memory controller 1200. Hereinafter, first to Nth nonvolatile memory devices 1100 respectively configuring first to Nth ways Way1 to WayN are referred to as first Way1 to Nth WayN nonvolatile memory devices, respectively. In other words, while the memory controller 1200 is transmitting data to the first Way1 nonvolatile memory device 1100 of the first channel CH1 through the first channel CH1, the second Way2 to Nth WayN nonvolatile memory devices 1100 of the first channel CH1 may not communicate data or a command with the memory controller 1200 through the first channel CH1. In other words, while any one of the first to Nth nonvolatile memory devices 1100 that share the first channel CH1 is occupying the first channel CH1, the other nonvolatile memory devices 1100 coupled to the first channel CH1 may not use the first channel CH1.

However, first Way1 nonvolatile memory device 1100 of the first channel CH1 and a first Way1 nonvolatile memory device 1100 of a second channel CH2 may independently communicate with the memory controller 1200. In other words, at the same time when the memory controller 1200 communicates data with the first Way1 nonvolatile memory device 1100 of the first channel CH1 through the first channel CH1 and the first channel interface 761, the memory controller 1200 may communicate data with the first Way1 nonvolatile memory device 1100 of the second channel CH2 through the second channel and the second channel interface 761.

Way1 to WayN memory devices 1100 coupled to one channel CH may perform, in parallel, the same operation mode. As an example, each of the nonvolatile memory devices 1100 coupled to the first channel CH1 may perform, in parallel, a read operation. As the number of nonvolatile memory devices 1100 that operate in parallel becomes greater, i.e., as the number of ways coupled to one channel CH becomes greater, the peak power consumption of the memory system 1000, i.e., the power consumption at a specific time may become greater.

Nonvolatile memory devices 1100 coupled to different channels CH may perform different operations. As an example, when each of the nonvolatile memory devices 1100 coupled to the first channel CH1 performs, in parallel, a read operation, each of the nonvolatile memory devices 1100 coupled to the second channel CH2 may perform, in parallel, a program operation. In other words, nonvolatile memory devices coupled to different channels may perform operations independently. In addition, as the number of channels CH that operate in parallel becomes greater, the peak power of the memory system 1000 may become greater.

Nonvolatile memory devices 1100 coupled to the same channel may not be configured to perform, in parallel, different operations.

When a large amount of peak power consumption occurs in the memory system 1000, the reliability of the memory system 1000 may deteriorate. Therefore, a technique for controlling the magnitude of instantaneously consumed peak power to a certain level or less in design of the memory system 1000 may be required.

Figure 4:
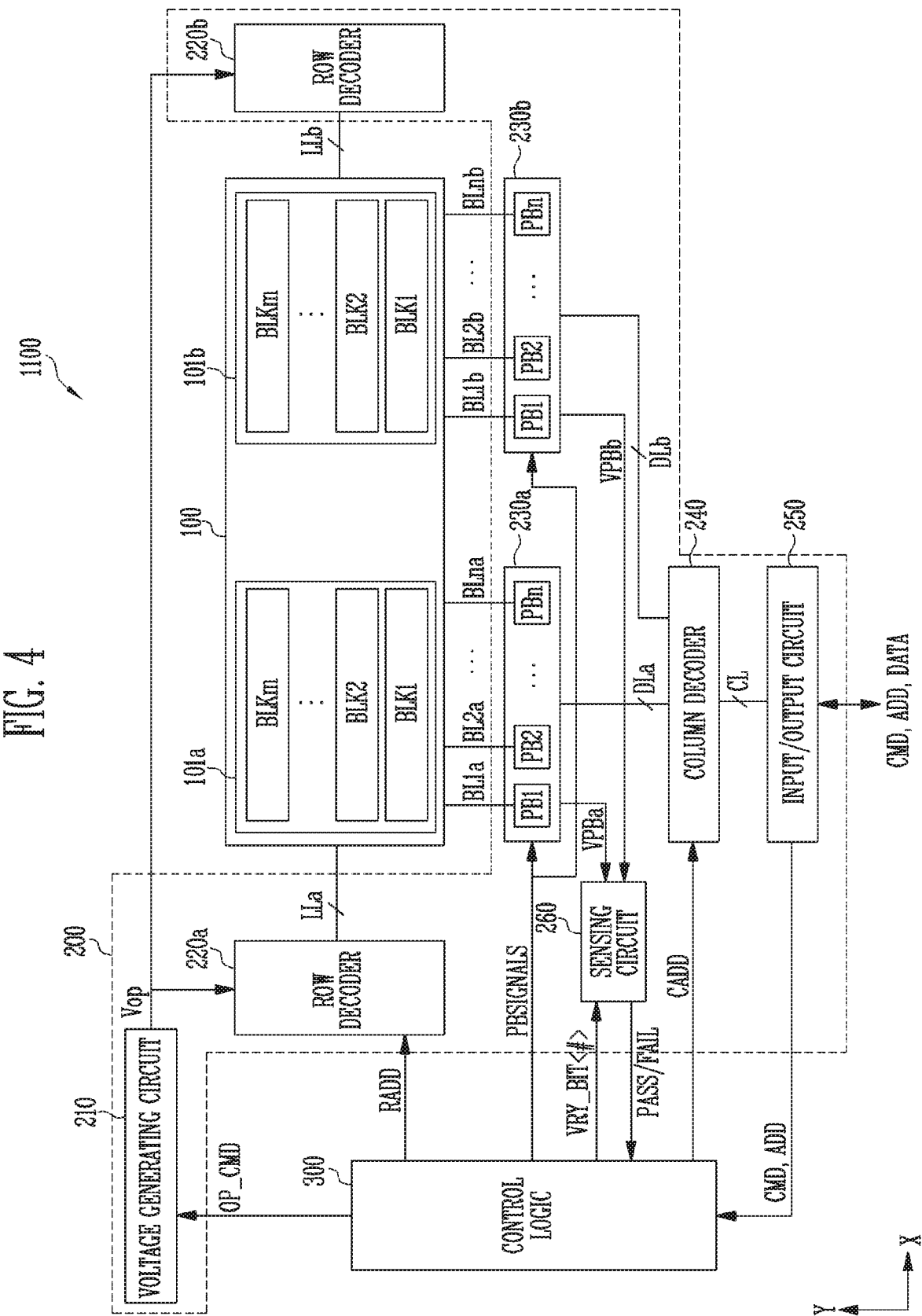
FIG. 4 is a diagram illustrating a nonvolatile memory device of FIG. 1.

FIG. 4 is a diagram illustrating the nonvolatile memory device of FIG. 1.

Referring to FIG. 4, the nonvolatile memory device 1100 may include a memory cell array 100 for storing data. The nonvolatile memory device 1100 may include peripheral circuits 200 configured to perform a program operation for storing data in the memory cell array 100, a read operation for outputting the stored data, and an erase operation for erasing the stored data. The nonvolatile memory device 1100 may include control logic 300 for controlling the peripheral circuits 200 under the control of the memory controller (1200 of FIG. 1).

The memory cell array 100 may include at least one memory plane, e.g., memory planes 101a and 101b. Each of the memory planes 101a and 101b may be configured in the same form. A plurality of memory blocks BLK1 to BLKm in the memory plane 101a or 101b may be formed to share a pocket p-well.

Each of the memory planes 101a and 101b may include a plurality of memory blocks BLK1 to BLKm (m is a positive integer). ath local lines LLa and ath bit lines BL1a to BLna (n is a positive integer) may be coupled to each of the memory blocks BLK1 to BLKm included in the memory plane 101a. In addition, bth local lines LLb and bth bit lines BL1b to BLnb (n is a positive integer) may be coupled to each of the memory blocks BLK1 to BLKm in the memory plane 101b.

For example, each of the ath local lines LLa and the bth local lines LLb may include a first select line, a second select line, and a plurality of word lines arranged between the first and second select lines. Also, each of the ath local lines LLa and the bth local lines LLb may include dummy lines arranged between the first select line and the word lines and between the second select line and the word lines. Here, the first select line may be a source select line, and the second select line may be a drain select line. For example, each of the ath local lines LLa and the bth local lines LLb may include word lines, drain and source select lines, and source lines SL. For example, each of the ath local lines LLa and the bth local lines LLb may further include dummy lines. For example, each of the ath local lines LLa and the bth local lines LLb may further include pipe lines.

The ath local lines LLa may be coupled to each of the memory blocks BLK1 to BLKm included in the memory plane 101a, and the ath bit lines BL1a to BLna may be commonly coupled to the memory blocks BLK1 to BLKm included in the memory plane 101a. In addition, the bth local lines LLb may be coupled to each of the memory blocks BLK1 to BLKm included in the memory plane 101b, and the bth bit lines BL1b to BLnb may be commonly coupled to the memory blocks BLK1 to BLKm included in the memory plane 101b. The memory blocks BLK1 to BLKm may be implemented in a two-dimensional or three-dimensional structure. For example, memory cells may be arranged in a direction parallel to a substrate in memory blocks BLK1 to BLKm having a two-dimensional structure. For example, memory cells may be arranged in a direction vertical to a substrate in memory blocks BLK1 to BLKm having a three-dimensional structure.

The peripheral circuits 200 may be configured to perform program, read, and erase operations of a selected memory block under the control of the control logic 300. For example, the peripheral circuits 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuits 200 may include a voltage generating circuit 210, a row decoder 220a coupled to the memory plane 101a, a row decoder 220b coupled to the memory plane 101b, a page buffer group 230a coupled to the memory plane 101a, a page buffer group 230b coupled to the memory plane 101b, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220a may transfer the operating voltages Vop to the ath local lines LLa coupled to a memory block included in the selected memory plane 101a in response to a row address RADD. In addition, the row decoder 220b may transfer the operating voltages Vop to the bth local lines LLb coupled to a memory block included in the selected memory plane 101b in response to a row address RADD.

The page buffer group 230a may include a plurality of page buffers PB1 to PBn coupled to the ath bit lines BL1a to BLna, and the page buffer group 230b may include a plurality of page buffers PB1 to PBn coupled to the bth bit lines BL1b to BLnb. The page buffers PB1 to PBn may operate in response to page buffer control signals PBSIG-NALS. For example, the page buffers PB1 to PBn in the page buffer group 230a may temporarily store data received through the ath bit lines BL1a to BLna, or sense voltages or currents of the ath bit lines BL1a to BLna in a read or verify operation.

The column decoder 240 may transfer data between the input/output circuit 250 and the page buffer groups 230a and 230b in response to a column address CADD. For example, the column decoder 240 may exchange data with the page buffers PB1 to PBn in the page buffer group 230a through ath data lines DLa, or exchange data with the page buffers PB1 to PBn in the page buffer group 230b through bth data lines DLb. Also, the column decoder 240 may exchange data with the input/output circuit 250 through column lines CL.

The input/output circuit 250 may transfer a command CMD and address ADD, which are received from the memory controller (1200 of FIG. 1), to the control logic 300, or exchange data DATA with the column decoder 240. The address ADD may include a row address RADD and a column address CADD.

The sensing circuit 260, in a read operation and a verify operation, may generate a reference current in response to a permission bit VRY_BIT<#>, and output a pass signal PASS or a fail signal FAIL by comparing an ath sensing voltage VPBa received from the page buffer group 230a or a bth sensing voltage VPBb received from the page buffer group 230b with a reference voltage generated by the reference current.

The control logic 300 may control the peripheral circuits 200 by outputting the operation signal OP_CMD, the row address RADD, the page buffer control signals PBSIG-NALS, and the permission bit VRY_BIT<#> in response to the command CMD and the address ADD. Also, the control logic 300 may determine whether the verify operation has passed or failed in response to the pass or fail signal PASS or FAIL.

In an operation of the nonvolatile memory device 1100, the memory blocks may be units of an erase operation. In other words, a plurality of memory cells in one memory block are simultaneously erased, and may not be selectively erased.

A plurality of memory planes 101a and 101b in one nonvolatile memory device 1100 may perform, in parallel, one operation mode. As an example, when a first memory plane 101a in a nonvolatile memory device 1100 performs a read operation, a second memory plane 101b included in the nonvolatile memory device 1100 may perform, in parallel, the read operation. As an example, when the first memory plane 101a in the nonvolatile memory device 1100 performs a read operation, the second memory plane 101b may not be configured to perform, in parallel, a program or erase operation different from the read operation.

As the number of memory planes 101a and 101b that operate in parallel becomes greater, the magnitude of peak power consumption that occurs in each of the plurality of nonvolatile memory devices 1100 in the memory system 1000 becomes greater. Consequently, the peak power consumption of the memory system 1000, i.e., the power consumption at a specific time may become greater.

A plurality of memory blocks BLK1 to BLKm in one memory plane 101a or 101b may be erased or programmed in parallel. As the number of memory blocks BLK1 to BLKm that operate in parallel becomes greater, the magnitude of peak power consumption that occurs in each of the plurality of nonvolatile memory devices 1100 in the memory system 1000 becomes greater. Consequently, the peak power consumption of the memory system 1000, i.e., the power consumption at a specific time may become greater.

As described above, when a large amount of peak power consumption occurs in the memory system 1000, the reliability of the memory system 1000 may deteriorate. Therefore, a technique for controlling the magnitude of instantaneously consumed peak power to a certain level or less in design of the memory system 1000 may be required.

Figure 5:
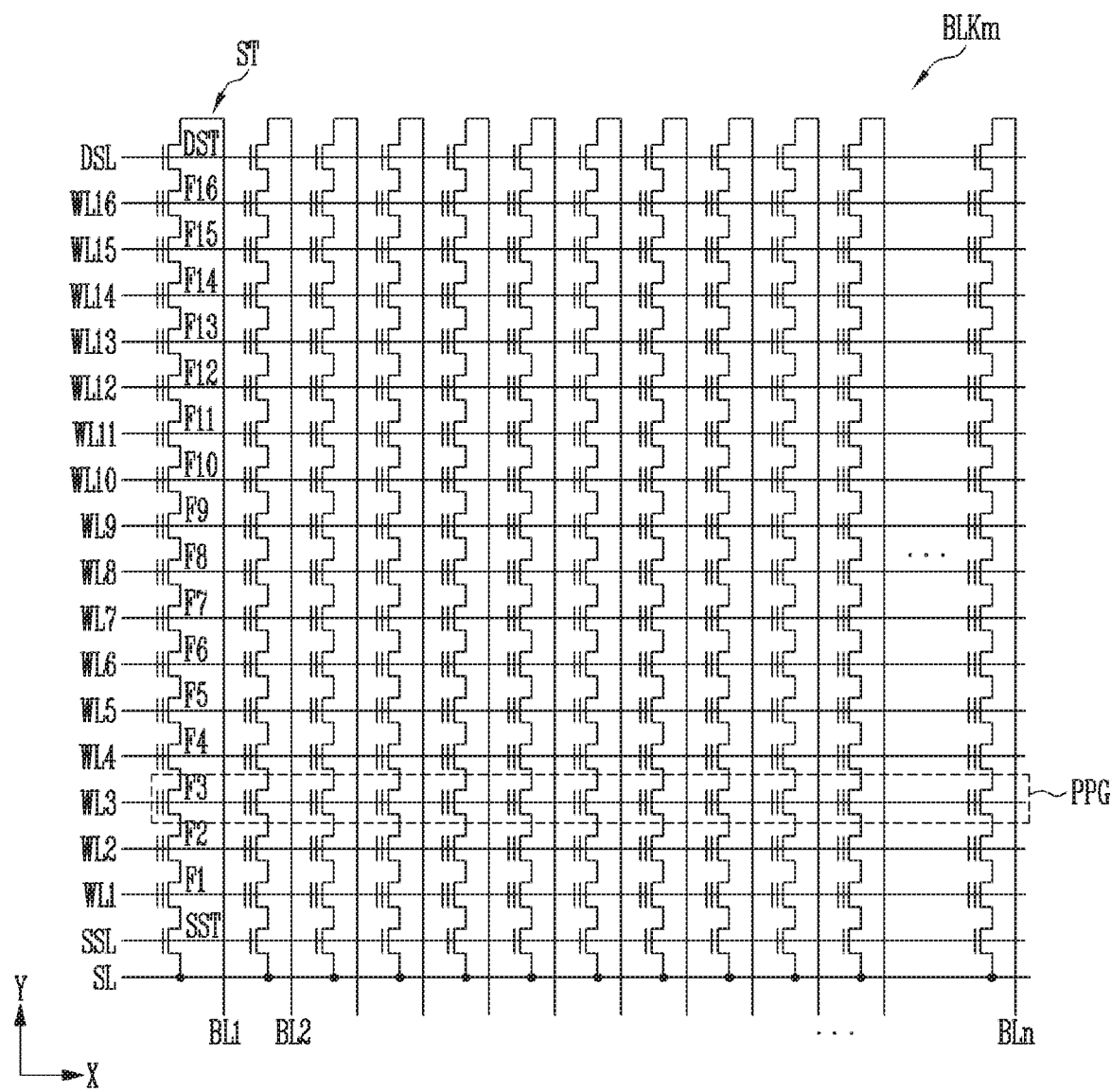
FIG. 5 is a diagram illustrating a memory block of FIG. 4.

FIG. 5 is a diagram illustrating the memory block of FIG. 4.

Referring to FIG. 5, in the memory block BLKm, a plurality of word lines arranged in parallel may be coupled between a first select line and a second select line. Here, the first select line may be a source select line SSL, and the second select line may be a drain select line DSL. More specifically, the memory block BLKm may include a plurality of strings ST coupled between bit lines BL1 to BLn and a source line SL. The bit lines BL1 to BLn may be coupled to the strings ST, respectively, and the source line SL may be commonly coupled to the strings ST. The strings ST may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and more than the sixteen memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST in different strings ST may be coupled to the source select line SSL, gates of drain select transistors DST in different strings ST may be coupled to the drain select line DSL, gates of the memory cells F1 to F16 in different strings ST may be coupled to a plurality of word lines WL1 to WL16. A group of memory cells coupled to the same word line among the memory cells included in different strings ST may be a physical page PPG. Therefore, physical pages PPG, of which number corresponds to that of the word lines WL1 to WL16, may be included in the memory block BLKm.

One memory cell may store data of one bit. This is generally called as a single level cell (SLC). In this case, one physical page PPG may store one logical page (LPG) data. The one LPG data may include data bits of which number corresponds to that of cells in one physical page PPG. In addition, one memory cell may store data of two or more bits. This is generally called as a multi-level cell (MLC). In this case, one physical page PPG may store two or more LPG data. As another example, one memory cell MC may store data of three bits. This is generally called as a triple-level cell (TLC). In this case, one physical page PPG may store three LPG data. In addition, one memory cell MC may store data of four bits. This is generally called as a quadruple-level cell (QLC). In this case, one physical page PPG may store four LPG data.

When one memory cell stores data of 2 bits, one physical page PPG may include two pages PG. One page PG may store one LPG data. One memory cell may have any one of a plurality of threshold voltages according to data, and a plurality of pages PG in one physical page PPG may be expressed by a difference in threshold voltage.

A plurality of memory cells in one memory block BLKm may be driven as SLCs. In other words, a plurality of memory cells included in one memory block BLKm may be programmed and read as SLCs. The memory block BLKm may be referred to as an SLC block. In addition, a plurality of memory cells in one memory block BLKm may be driven as MLCs. In other words, a plurality of memory cells in one memory block BLKm may be programmed and read as MLCs. The memory block BLKm may be referred to as an MLC block.

A plurality of memory cells in one memory block BLKm may be driven as TLCs. In other words, a plurality of memory cells in one memory block BLKm may be programmed and read as TLCs. The memory block BLKm may be referred to as a TLC block. In addition, a plurality of memory cells in one memory block BLKm may be driven as QLCs. In other words, a plurality of memory cells included in one memory block BLKm may be programmed and read as QLCs. The memory block BLKm may be referred to as a QLC block.

The nonvolatile memory device 1100 may include one or more SLC blocks, one or more MLC blocks, one or more TLC blocks, and one or more QLC blocks.

Figure 6:
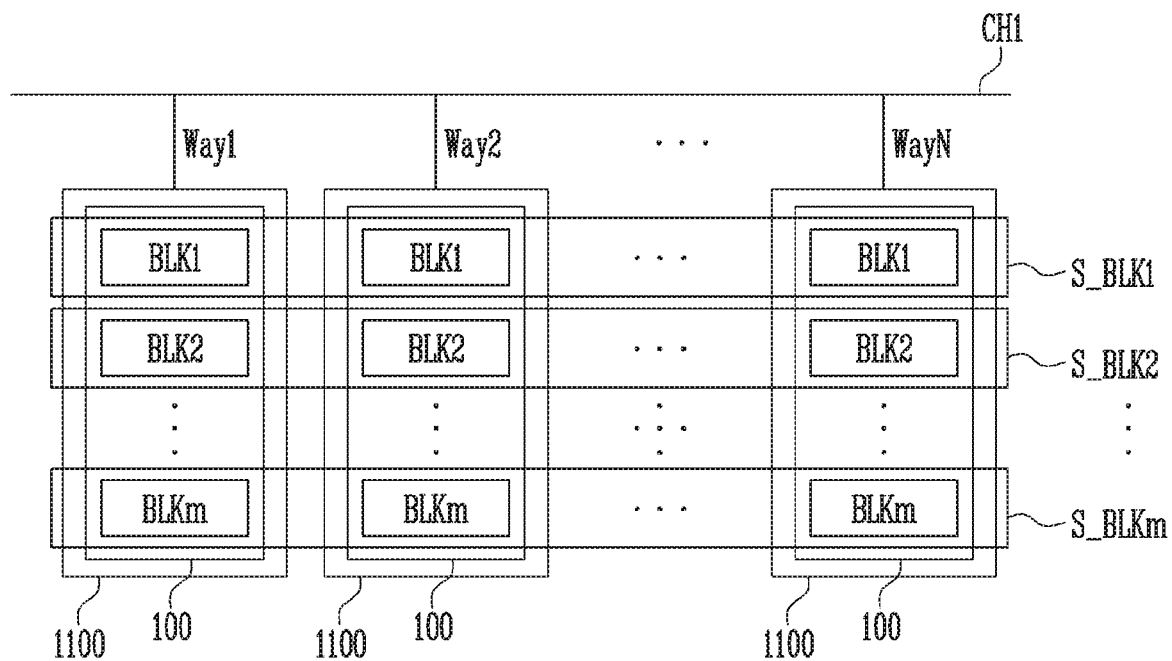
FIG. 6 is a diagram illustrating a super block.

FIG. 6 is a diagram illustrating a super block.

Referring to FIG. 6, each of a plurality of ways Way1 to WayN constituting a first channel CH1 may be configured with one or more nonvolatile memory devices 1100. As described above, one nonvolatile memory device 1100 may include a memory cell array 100 for storing data. The memory cell array 100 may include a plurality of memory blocks BLK1 to BLKm. An erase operation may be independently performed on each of the memory blocks BLK1 to BLKm 110. An erase operation may be simultaneously performed on a plurality of memory cells in one memory block.

A super block may be configured with a set of memory blocks selected in the respective nonvolatile memory devices 1100 constituting different ways on the same channel. In other words, a first super block S_BLK1 may be configured with a first memory block BLK1 in a first Way1 nonvolatile memory device 1100, a first memory block BLK1 in a second Way2 nonvolatile memory device 1100 to a first memory block BLK1 in an Nth WayN nonvolatile memory device 1100. In addition, a second super block S_BLK2 may be configured with a second memory block BLK2 in the first Way1 nonvolatile memory device 1100, a second memory block BLK2 in the second Way2 nonvolatile memory device 1100 to a memory block BLK2 in the Nth WayN nonvolatile memory device 1100. Similarly, an mth super block S_BLKm may be configured with an mth memory block BLKm in the first Way1 nonvolatile memory device 1100, an mth memory block BLKm in the second Way2 nonvolatile memory device 1100 to an mth memory block BLKm in the Nth WayN nonvolatile memory device 1100.

A plurality of memory blocks in one super block are physically different memory blocks, but may logically operate as one memory block. In other words, the plurality of memory blocks in the one super block may be simultaneously programmed or erased. The memory system 1000 performs a program or erase operation in units of super blocks, thereby improving the performance of the program or erase operation. Also, the memory system 1000 performs an operation such as garbage collection or wear leveling in units of super blocks, thereby more efficiently managing a plurality of memory blocks.

A read, program or erase operation may be performed in parallel on the plurality of memory blocks in one super block. As the number of memory blocks that operate in parallel become greater, i.e., as the number of memory blocks constituting one super block becomes greater, the peak power consumption of the memory system 1000, i.e., the power consumption at a specific time may become greater. In addition, as the number of channels CH that operate in parallel becomes greater, the peak power of the memory system 1000 may become greater.

When a large amount of peak power consumption occurs in the memory system 1000, the reliability of the memory system 1000 may deteriorate. Therefore, a technique for controlling the magnitude of instantaneously consumed peak power to a certain level or less in design of the memory system 1000 may be required.

Figure 7:
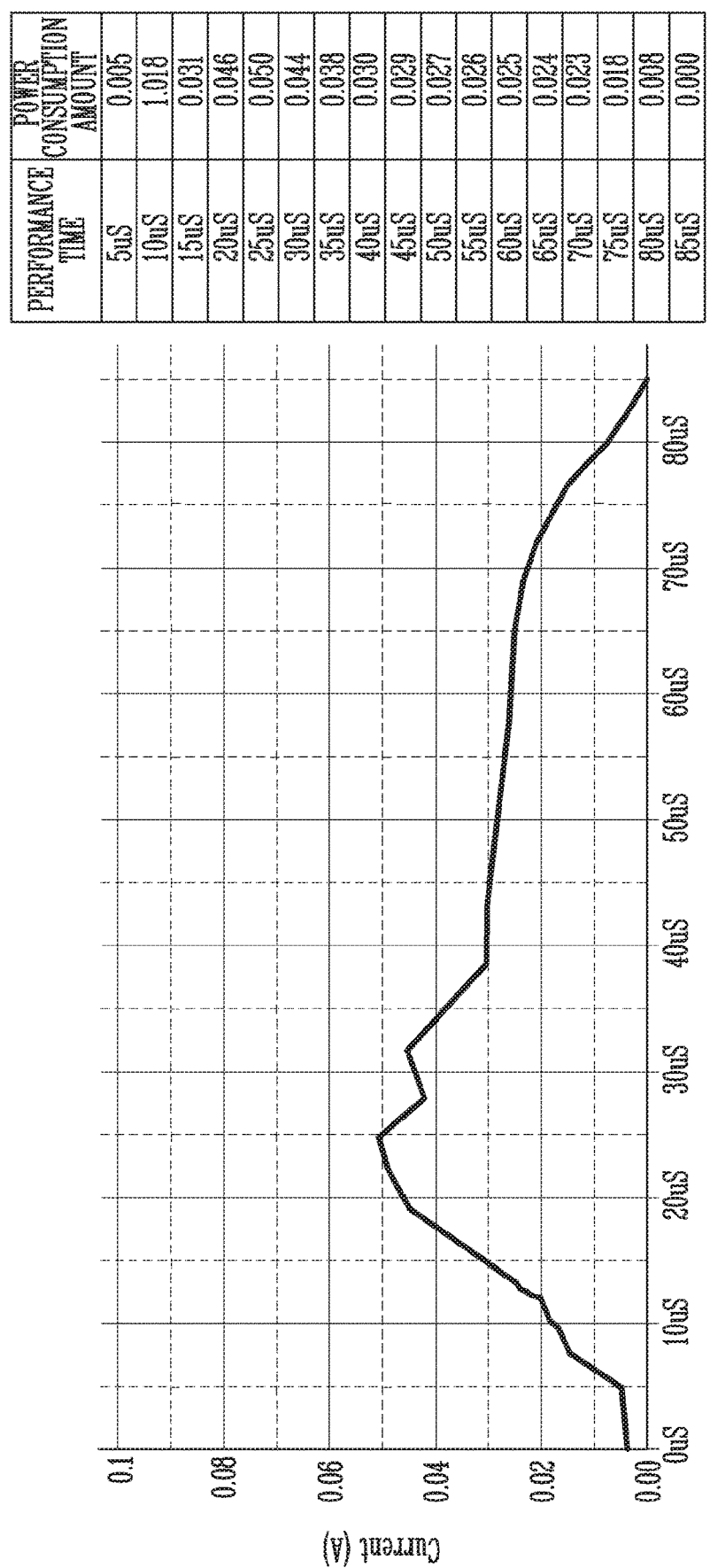
FIG. 7 is a diagram illustrating power consumption amounts with respect to time in a read operation.

FIG. 7 is a diagram illustrating power consumption amounts with respect to performance time in a read operation.

Referring to FIG. 7, when a read operation is started in the nonvolatile memory device 1100, the voltage generating circuit 210 of the nonvolatile memory device 1100 may first generate a high voltage for the read operation. At this time, a high voltage pump (not shown) in the voltage generating circuit 210 is operated, and a large amount of power may be generally consumed in the operation of the high voltage pump. Consequently, a large amount of power consumption may occur in the nonvolatile memory device 1100 when the read operation is started.

After the nonvolatile memory device 1100 generates the high voltage for the read operation, the nonvolatile memory device 1100 may apply the generated high voltage to a word line and precharge a plurality of bit lines with a predetermined voltage magnitude. During performance of the read operation, the nonvolatile memory device 1100 may consume the largest amount of power when a charging operation is performed on the word and bit lines. As an example, power consumption of about 50 µA may occur.

After the charging operation is performed on the word and bit lines, the nonvolatile memory device 1100 may read data stored in a memory cell MC and temporarily store the read data in the page buffer group 230a or 230b.

The memory system 1000 may store, as a table, power consumption amounts with respect to performance times generated when the nonvolatile memory device 1100 performs the read operation. As an example, the memory system 1000 may store power consumption amounts with a resolution of 1 mA, segmented at time intervals of 5 µs, when the nonvolatile memory device 1100 performs the read operation. The results may be stored as a table, as shown in FIG. 7. Different time intervals can be used. For example, a time interval of 1 µs can be used, in which case corresponding power consumption amounts with a resolution of 1 mA may be stored. Accordingly, the memory system 1000 can derive, through the table, power consumption amounts of the nonvolatile memory device 1100 with respect to times, without any separate measurement of power consumption after a command for the read operation is input to the nonvolatile memory device 1100.

In a program operation and an erase operation, the memory system 1000 may store power consumption amounts with respect to times as a table and store the table. As an example, in the program operation, the power consumption amount may be quantified at a time interval different from that in the read operation. As an example, in the read operation, the power consumption amount may be quantified at a time interval of 1 µs. In the program operation, the power consumption amount may be quantified at a time interval of 10 µs. The time taken to perform the program operation may be shorter than that taken to perform the read operation. This is because a change in power consumption amount per unit time in the program operation may be smaller than that in the read operation.

Also, in the erase operation, the power consumption may be quantified at a time interval different from those in the read operation and the program operation. As an example, in the erase operation, the power consumption amount may be quantified at a time interval of 200 µs. The time taken to perform the erase operation may be shorter than those taken to perform the read operation and the program operation. This is because a change in power consumption amount per unit time in the erase operation may be smaller than that in the read operation or the program operation.

In addition, the memory system 1000 may store power consumption amounts as a table and manage the table even when an operation performed in the nonvolatile memory device 1100, such as a cache read operation or a cache program operation, and data transmission between the nonvolatile memory device 1100 and the memory controller 1200 are simultaneously performed.

Figure 8:
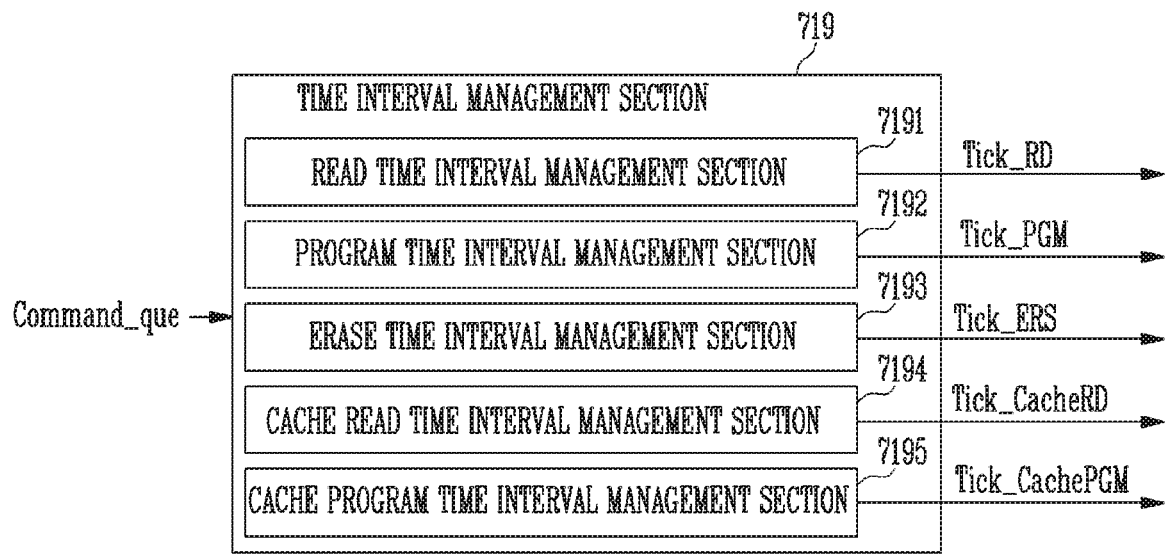
FIG. 8 is a diagram illustrating a time interval management section according to an embodiment of the present disclosure.

FIG. 8 is a diagram illustrating a time interval management section according to an embodiment of the present disclosure.

Referring to FIG. 8, the memory controller 1200 may include a time interval management section 719. In addition, the time interval management section 719 may include a read time interval management section 7191, a program time interval management section 7192, an erase time interval management section 7193, a cache read time interval management section 7194, and a cache program time interval management section 7195. As another example, the time interval management section 719 may be included in the processor 710.

The read time interval management section 7191 may generate and output a read notification signal Tick_RD by counting a time that elapses from a point of time when the nonvolatile memory device 1100 starts a read operation. As an example, the read notification signal Tick_RD may include a plurality of voltage pulses. In other words, the read notification signal Tick_RD may include pulses generated at a set or predetermined time interval.

As an example, when a read power consumption profile table of a power consumption profile table storing section 714 (of FIG. 9) includes a power consumption amount at a first time interval, the read time interval management section 7191 may generate and output the read notification signal Tick_RD including pulses generated at the first time interval starting from when the nonvolatile memory device 1100 starts the read operation.

As another example, the read time interval management section 7191 may generate and output the read notification signal Tick_RD including pulses periodically generated at the first time interval regardless of when the nonvolatile memory device 1100 starts the read operation.

The program time interval management section 7192 may generate and output a program notification signal Tick_PGM by counting a time that elapses from when the nonvolatile memory device 1100 starts a program operation. As an example, the program notification signal Tick_PGM may include a plurality of voltage pulses. In other words, the program notification signal Tick_PGM may include pulses generated at a set or predetermined time interval.

As an example, when a program power consumption profile table of the power consumption profile table storing section 714 includes a power consumption amount at a second time interval, the program time interval management section 7192 may generate and output the program notification signal Tick_PGM including pulses generated at the second time interval starting from when the nonvolatile memory device 1100 starts the program operation.

As another example, the program time interval management section 7192 may generate and output the program notification signal Tick_PGM including pulses periodically generated at the second time interval regardless of when the nonvolatile memory device 1100 starts the program operation.

The second time interval of the pulses in the program notification signal Tick_PGM may be greater than the first time interval of the pulses in the read notification signal Tick_RD.

The erase time interval management section 7193 may generate and output an erase notification signal Tick_ERS by counting a time that elapses from when the nonvolatile memory device 1100 starts an erase operation. As an example, the erase notification signal Tick_ERS may include a plurality of voltage pulses. In other words, the erase notification signal Tick_ERS may include pulses generated at a set or predetermined time interval.

As an example, when an erase power consumption profile table of the power consumption profile table storing section 714 includes a power consumption amount at a third time interval, the erase time interval management section 7193 may generate and output the erase notification signal Tick_ERS including pulses generated at the third time interval starting from when the nonvolatile memory device 1100 starts the erase operation.

As another example, the erase time interval management section 7193 may generate and output the erase notification signal Tick_ERS including pulses periodically generated at the third time interval regardless of when the nonvolatile memory device 1100 starts the erase operation.

The third time interval of the pulses included in the erase notification signal Tick_ERS may be greater than the first time interval of the pulses in the read notification signal Tick_RD and the second time interval of the pulses included in the program notification signal Tick_PGM.

The cache read time interval management section 7194 may generate and output a cache read notification signal Tick_CacheRD by counting a time that elapses from when the nonvolatile memory device 1100 starts a cache read operation. As an example, the cache read notification signal Tick_CacheRD may include pulses generated at a set or to predetermined time interval.

As an example, when a cache read power consumption profile table of the power consumption profile table storing section 714 includes a power consumption amount at a fourth time interval, the cache read time interval management section 7194 may generate and output the cache read notification signal Tick_CacheRD including pulses generated at the fourth time interval from when the nonvolatile memory device 1100 starts the cache read operation.

The fourth time interval of the pulses included in the cache read notification signal Tick_CacheRD may be equal to or different from the first time interval of the pulses in the read notification signal Tick_RD.

As another example, the cache read time interval management section 7194 may generate and output the cache read notification signal Tick_CacheRD including pulses periodically generated at the fourth time interval regardless of when the nonvolatile memory device 1100 starts the cache read operation.

The cache program time interval management section 7195 may generate and output a cache program notification signal Tick_CachePGM by counting a time that elapses from when the nonvolatile memory device 1100 starts a cache program operation. As an example, the cache program notification signal Tick_CachePGM may include a plurality of voltage pulses. In other words, the cache program notification signal Tick_CachePGM may include pulses generated at a set or predetermined time interval.

As an example, when a cache program power consumption profile table of the power consumption profile table storing section 714 includes a power consumption amount at a fifth time interval, the cache program time interval management section 7195 may generate and output the cache program notification signal Tick_CachePGM including pulses generated at the fifth time interval from when the nonvolatile memory device 1100 starts the cache program operation.

As another example, the cache program time interval management section 7195 may generate and output the cache program notification signal Tick_CachePGM including pulses periodically generated at the fifth time interval regardless of when the nonvolatile memory device 1100 starts the cache program operation.

The fifth time interval of the pulses in the cache program notification signal Tick_CachePGM may be equal to or different from the second time interval of the pulses in the program notification signal Tick_PGM.

The time interval management section 719 may start generating pulses in a notification signal in response to a queue command signal Command_que output from the processor 710. As an example, when the queue command signal Command_que corresponds to a read command, the time interval management section 719 may start generating the read notification signal Tick_RD pulses at the first time interval. Also, when the queue command signal Command_que is a signal corresponding to a program command, the time interval management section 719 may start generating the program notification signal Tick_PGM pulses at the second time interval. Also, when the queue command signal Command_que is a signal corresponding to an erase command, the time interval management section 719 may start generating the erase notification signal Tick_ERS pulses at the third time interval.

Figure 9:
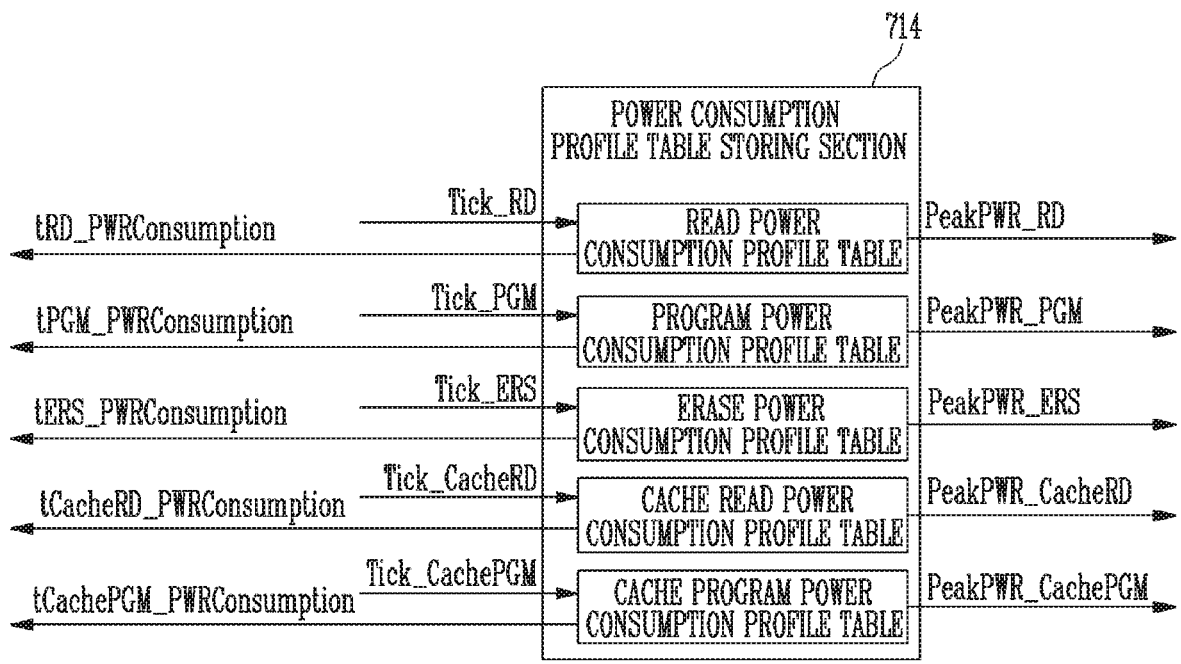
FIG. 9 is a diagram illustrating a power consumption profile table storing section according to an embodiment of the present disclosure.

FIG. 9 is a diagram illustrating a power consumption profile table storing section according to an embodiment of the present disclosure.

Referring to FIG. 9, the memory controller 1200 may further include a power consumption profile table storing section 714. In addition, the power consumption profile table storing section 714 may include a read power consumption profile table, a program power consumption profile table, an erase power consumption profile table, a cache read power consumption profile table, and a cache program power consumption profile table. As another example, the power consumption profile table storing section 714 may be included in the processor 710.

The read power consumption profile table may represent power consumption amounts with respect to time periods within a read operation. As an example, the read power consumption profile table may represent power consumption amounts for time periods at a set time interval starting from when a command for the read operation is input to the nonvolatile memory device 1100. Also, the read power consumption profile table may represent power consumption amounts consumed by at least one of the memory planes 101*a* and 101*b* in the nonvolatile memory device 1100. When read operations are simultaneously performed in the plurality of memory planes 101*a* and 101*b*, the processor 710 may derive a power consumption amount consumed by the nonvolatile memory device 1100 for one or more intervals by multiplying the corresponding power consumption amount(s) stored in the read power consumption profile table by the number of memory planes 101*a* and 101*b* in which the read operations are performed.

As an example, the read power consumption profile table may include a power consumption amount at a first time interval in the read operation. As an example, the first time interval may be 1 µs, and the read power consumption profile table may include power consumption amounts for time periods of the read operation at the time interval of 1 µs. The power consumption profile table storing section 714 may generate and output a read time signal power consumption signal tRD_PWRConsumption corresponding to the power consumption amounts with respect to the time periods when the nonvolatile memory device 1100 performs the read operation based on the read power consumption profile table.

The power consumption profile table storing section 714 may generate and output the read time power consumption signal tRD_PWRConsumption corresponding to the power consumption amounts with respect to the time periods during which the nonvolatile memory device 1100 performs the read operation, based on the read notification signal Tick_RD output from the read time interval management section 7191. In other words, the power consumption profile table storing section 714 may detect a time period of the read operation, based on the read notification signal Tick_RD.

The program power consumption profile table may represent power consumption amounts with respect to time periods of a program operation. As an example, the program power consumption profile table may represent power consumption amounts, divided into time periods, starting from when a command for the program operation is input to the nonvolatile memory device 1100. Also, the program power consumption profile table may represent power consumption of at least one of memory planes 101a and 101b in the nonvolatile memory device 1100. When program operations are simultaneously performed in the plurality of memory planes 101a and 101b, the processor 710 may derive a total power consumption amount consumed by the nonvolatile memory device 1100 by multiplying a power consumption amount for the applicable time period(s) stored in the program power consumption profile table by the number of memory planes 101a and 101b in which the program operations are performed.

As an example, the program power consumption profile table may include power consumption amounts at a second time interval in the program operation. As an example, the second time interval may be 10 µs, and the program power consumption profile table may include power consumption amounts of the program operation for time periods at the interval of 10 µs. The power consumption profile table storing section 714 may generate and output a program time power consumption signal tPGM_PWRConsumption corresponding to the power consumption amounts with respect to time periods of the program operation based on the program power consumption profile table.

The power consumption profile table storing section 714 may generate and output the program time power consumption signal tPGM_PWRConsumption corresponding to the power consumption amounts with respect to time periods of the program operation based on the program notification signal Tick_PGM output from the program time interval management section 7192. In other words, the power consumption profile table storing section 714 may detect a time period of the program operation based on the program notification signal Tick_PGM.

The erase power consumption profile table may represent power consumption amounts with respect to time periods of an erase operation. As an example, the erase power consumption profile table may represent power consumption amounts, divided into time periods, from when a command for the erase operation is input to the nonvolatile memory device 1100. Also, the erase power consumption profile table may represent power consumption amounts consumed by at least one of memory planes 101a and 101b in the nonvolatile memory device 1100. When erase operations are simultaneously performed in the plurality of memory planes 101a and 101b included in the nonvolatile memory device 1100, the processor 710 may derive a total power consumption amount consumed by the nonvolatile memory device 1100 by multiplying a power consumption amount for the applicable time period(s) stored in the erase power consumption profile table by the number of memory planes 101a and 101b in which the erase operations are performed.

As an example, the erase power consumption profile table may include power consumption amounts at a third time interval in the erase operation. As an example, the third time interval may be 200 µs, and the erase power consumption profile table may include a power consumption amounts of the erase operation divided into time periods of a third time interval of 200 µs. The power consumption profile table storing section 714 may generate and output an erase time power consumption signal tERS_PWRConsumption corresponding to the power consumption amounts with respect to time periods of the erase operation based on the erase power consumption profile table.

The power consumption profile table storing section 714 may generate and output the erase time power consumption signal tERS_PWRConsumption corresponding to the power consumption amounts with respect to time periods of the erase operation based on the erase notification signal Tick_ERS output from the erase time interval management section 7193. In other words, the power consumption profile table storing section 714 may detect a time period of the erase operation based on the erase notification signal Tick_ERS.

The cache read power consumption profile table may represent power consumption amounts with respect to time periods of a cache read operation. In other words, the cache read power consumption profile table may represent power consumption amounts with respect to time periods of an operation of outputting read data stored in the page buffer groups 230a and 230b to the memory controller 1200 while internally performing a read operation.

As an example, the cache read power consumption profile table may include power consumption amounts at a fourth time interval in the cache read operation. The power consumption profile table storing section 714 may generate and output a cache read time power consumption signal tCacheRD_PWRConsumption corresponding to the power consumption amounts with respect to time periods of the cache read operation based on the cache read power consumption profile table. As an example, the fourth time interval may be equal to or different from the first time interval.

The power consumption profile table storing section 714 may generate and output the cache read time power consumption signal tCacheRD_PWRConsumption corresponding to the power consumption amounts with respect to time periods of the cache read operation, based on the cache read notification signal Tick_CacheRD output from the cache read time interval management section 7194. In other words, the power consumption profile table storing section 714 may detect a time period of the cache read operation based on the cache read notification signal Tick_CacheRD.

The cache program power consumption profile table may represent power consumption amounts with respect to time periods of a cache program operation. In other words, the cache program power consumption profile table may represent power consumption amounts with respect to time periods of an operation of latching program data input from the memory controller 1200 to the page buffer groups 230a and 230b while internally performing a program operation.

As an example, the cache program power consumption profile table may include power consumption amounts at a fifth time interval in the cache program operation. The power consumption profile table storing section 714 may generate and output a cache program time power consumption signal tCachePGM_PWRConsumption corresponding to the power consumption amounts with respect to time periods of the cache program operation based on the cache program power consumption profile table. As an example, the fifth time interval may be equal to or different from the second time interval.

The power consumption profile table storing section 714 may generate and output the cache program time power consumption signal tCachePGM_PWRConsumption corresponding to the power consumption amounts with respect to time periods of the cache program operation based on the cache program notification signal Tick_CachePGM output from the cache program time interval management section 7195. In other words, the power consumption profile table storing section 714 may detect a time period of the cache program operation based on the cache program notification signal Tick_CachePGM.

The power consumption profile table storing section 714 may output a read peak power signal PeakPWR_RD corresponding to the maximum value among the power consumption amounts with respect to the time periods of the read operation, a program peak power signal PeakPWR_PGM corresponding to the maximum value among the power consumption amounts with respect to the time periods of the program operation, an erase peak power signal PeakPWR_ERS corresponding to the maximum value among the power consumption amounts with respect to the time periods of the erase operation, a cache read peak power signal PeakPWR_CacheRD corresponding to the maximum value among the power consumption amounts with respect to the time periods of the cache read operation, and a cache program peak power signal PeakPWR_CachePGM corresponding to the maximum value among the power consumption amounts with respect to the time periods of the cache program operation. As an example, referring to FIG. 7, the nonvolatile memory device 1100 may consume a peak power of about 50 mA at an elapsed time of 25 μs from the point of time when the nonvolatile memory device 1100 starts the read operation.

The power consumption profile table storing section 714 may generate the read peak power signal PeakPWR_RD, the program peak power signal PeakPWR_PGM, the erase peak power signal PeakPWR_ERS, the cache read peak power signal PeakPWR_CacheRD, and the cache program peak power signal PeakPWR_CachePGM, respectively based on the read power consumption profile table, the program power consumption profile table, the erase power consumption profile table, the cache read power consumption profile table, and the cache program power consumption profile table.

Figure 10:
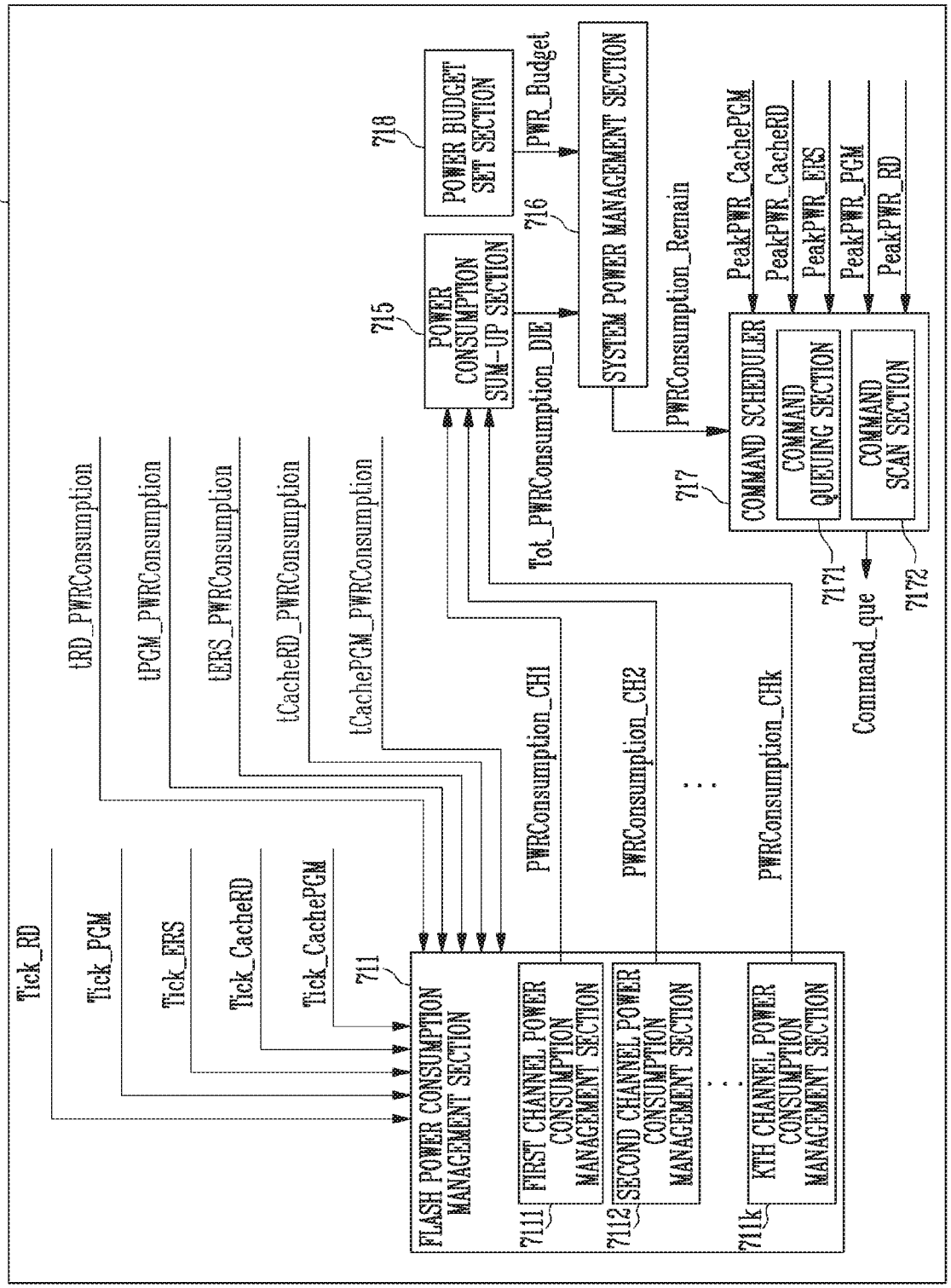
FIG. 10 is a diagram illustrating a processor according to an embodiment of the present disclosure.

FIG. 10 is a diagram illustrating a processor according to an embodiment of the present disclosure.

Referring to FIG. 10, the processor 710 may further include a flash power consumption management section 711. In addition, the flash power consumption management section 711 may include first to kth channel power consumption management sections 7111 to 711k.

The first to kth channel power consumption management sections 7111 to 711k may derive power consumption amounts generated from the nonvolatile memory devices 1100 respectively coupled to the first to kth channel CH1 to CHk. Also, the first to kth channel power consumption management sections 7111 to 711k may output first to kth power consumption signals PWRConsumption_CH1 to PWRConsumption_CHk corresponding to the derived power consumption amounts, respectively.

When the nonvolatile memory devices 1100 coupled to the first channel CH1 perform operations, the first channel power consumption management section 7111 may calculate a power consumption amount of the nonvolatile memory devices 1100 coupled to the first channel CH1 with respect to time periods, based on the power consumption amounts provided from the power consumption profile table storing section 714 and an operation time provided from the time interval management section 719.

As another example, the first channel power consumption management section 7111 may calculate a power consumption amount of the nonvolatile memory devices 1100 coupled to the first channel CH1 with respect to time periods based on the power consumption amounts provided from the power consumption profile table storing section 714 without information on the time periods provided from the time interval management section 719.

The first channel power consumption management section 7111 may derive an amount of power consumption consumed by the nonvolatile memory devices 1100 coupled to the first channel CH1, based on the number of ways coupled to the first channel CH1, i.e., the number of nonvolatile memory devices 1100 that perform operations in parallel. Also, the first channel power consumption management section 7111 may derive a power consumption amount of the nonvolatile memory devices 1100 coupled to the first channel CH1, based on the number of memory planes 101a and 101b that perform operations in each of the nonvolatile memory devices 1100 coupled to the first channel CH1, and generate and output the first power consumption signal PWRConsumption_CH1 corresponding to the derived power consumption amount.

As another example, the first channel power consumption management section 7111 may request the power consumption profile table storing section 714 for information on a power consumption amount of operations being performed by the nonvolatile memory devices 1100 coupled to the first channel CH1 based on the notification signal transferred from the time interval management section 719, and receive the requested information from the power consumption profile table storing section 714. The notification signal may include a read notification signal Tick_RD, a program notification signal Tick_PGM, an erase notification signal Tick_ERS, a cache read notification signal Tick_CacheRD, and a cache program notification signal Tick_CachePGM. The first channel power consumption management section 7111 may select any one of the plurality of notification signals described above, based on the operations being performed by the nonvolatile memory devices 1100 coupled to the first channel CH1.

As an example, when the nonvolatile memory devices 1100 coupled to the first channel CH1 perform read operations, the first channel power consumption management section 7111 may derive an amount of power consumed by the nonvolatile memory devices 1100 coupled to the first channel CH1 with respect to time periods of the read operations, based on one or more of the power consumption amounts with respect to the time periods, which are output from the read power consumption profile table of the power consumption profile table storing section 714, the number of nonvolatile memory devices 1100 coupled to the first channel CH1, the number of memory planes 101a and 101b on which the read operation is performed in each of the nonvolatile memory devices 1100, and the read notification signal Tick_RD transferred from the read time interval management section 7191, and generate and output a first power consumption signal PWRConsumption_CH1 corresponding to the derived power consumption amount.

As another example, the first channel power consumption management section 7111 may request the power consumption profile table storing section 714 for information on a power consumption amount generated by a read mode being performed at a corresponding time based on the read notification signal Tick_RD transferred from the read time interval management section 7191 when the nonvolatile memory devices 1100 coupled to the first channel CH1 is performs the read operation, and receive the requested information from the power consumption profile table storing section 714. That is, the power consumption profile table storing section 714 may output the power consumption amount of the currently performed read operation based on the read power consumption profile table.

Also, the first channel power consumption management section 7111 may derive a power consumption amount generated by all of the nonvolatile memory devices 1100 coupled to the first channel CH1, based on the information transferred from the power consumption profile table storing section 714, the number of nonvolatile memory devices 1100 coupled to the first channel CH1, and the number of memory planes 101a and 101b on which the read operation is performed in each of the nonvolatile memory devices 1100.

As another example, when the nonvolatile memory devices 1100 coupled to the first channel CH1 perform program operations, the first channel power consumption management section 7111 may derive an amount of power consumed by the nonvolatile memory devices 1100 coupled to the first channel CH1 with respect to time periods of the program operations, based on one or more of the power consumption amounts with respect to such times, which are transferred from the program power consumption profile table of the power consumption profile table storing section 714, the number of nonvolatile memory devices 1100 coupled to the first channel CH1, the number of memory planes 101a and 101b on which the program operation is performed in each of the nonvolatile memory devices 1100, and the program notification signal Tick_PGM transferred from the program time interval management section 7192, and generate and output a first power consumption signal PWRConsumption_CH1 corresponding to the derived power consumption.

As another example, the first channel power consumption management section 7111 may request the power consumption profile table storing section 714 for information on a power consumption amount generated by a program operation being performed at a corresponding time based on the program notification signal Tick_PGM transferred from the program time interval management section 7192 when the nonvolatile memory devices 1100 coupled to the first channel CH perform the program operation, and receive the request information from the power consumption profile table storing section 714.

Also, the first channel power consumption management section 7111 may derive a power consumption amount of all of the nonvolatile memory devices 1110 coupled to the first channel CH1 based on the information transferred from the program power consumption profile table of the power consumption profile table storing section 714, the number of nonvolatile memory devices coupled to the first channel CH1, and the number of memory planes 101a and 101b on which the program operation is performed in each of the nonvolatile memory devices 1100.

As another example, when the nonvolatile memory devices 1100 coupled to the first channel CH1 performs the erase operation, the first channel power consumption management section 7111 may derive an amount of power consumed by the nonvolatile memory devices 1100 coupled to the first channel CH1 with respect to time periods of the erase operation based on one or more of the a power consumption amounts with respect to the time periods, which is output from the erase power consumption profile table of the power consumption profile table storing section 714, the number of nonvolatile memory devices 1100 coupled to the first channel CH1, the number of memory blocks on which the erase operation is performed in each of the nonvolatile memory devices 1100, and the erase notification signal Tick_ERS transferred from the erase time interval management section 7193, and generate and output a first power consumption signal PWRConsumption_CH1 corresponding to the derived power consumption amount.

As another example, the first channel power consumption management section 7111 may request the power consumption profile table storing section 714 for information on a power consumption amount generated by the erase operation with respect to the time based on the erase notification signal Tick_ERS transferred from the erase time interval management section 7193 when the nonvolatile memory devices 1100 coupled to the first channel CH1 performs the erase operation, and receive the requested information from the power consumption profile table storing section 714. The power consumption profile table storing section 714 may output the information based on the erase power consumption profile table.

Also, the first channel power consumption management section 7111 may derive a power consumption amount of all of the nonvolatile memory devices 1100 coupled to the first channel CH1 based on one or more of the information output by the power consumption profile table storing section 714 through the erase power consumption profile table, the number of nonvolatile memory devices 1100 coupled to the first channel CH1, and the number of memory blocks on which the erase operation is performed in each of the nonvolatile memory devices 1100.

As another example, when the nonvolatile memory devices 1100 coupled to the first channel CH1 perform cache read operations, the first channel power consumption management section 7111 may derive an amount of power consumed by the nonvolatile memory devices 1100 coupled to the first channel CH1 with respect to time periods of the cache read operation based on one or more the a power consumption amounts with respect to the time periods, which is output from the cache read power consumption profile table of the power consumption profile table storing section 714, the number of nonvolatile memory devices 1100 coupled to the first channel CH1, and the cache read notification signal Tick_CacheRD transferred from the cache read time interval management section 7194, and generate and output a first power consumption signal PWRConsumption_CH1 corresponding to the derived power consumption amount.

As another example, when the nonvolatile memory devices 1100 coupled to the first channel CH1 perform the cache program operations, the first channel power consumption management section 7111 may derive an amount of power consumed by the nonvolatile memory devices 1100 coupled to the first channel CH1 with respect to time periods based on one or more of the a power consumptions with respect to the time periods, which is output from the cache program power consumption profile table of the power consumption profile table storing section 714, the number of nonvolatile memory devices 1100 coupled to the first channel CH1, and the cache program notification signal Tick_CachePGM transferred from the cache program time interval management section 7195, and generate and output a first power consumption signal PWRConsumption_CH1 corresponding to the derived power consumption amount.

The processor 710 may further include a power consumption sum-up section 715. The power consumption sum-up section 715 may sum up power consumption values respectively derived from the first to kth channel power consumption management sections 7111 to 711k. In other words, the power consumption sum-up section 715 may derive a total power amount consumed by the nonvolatile memory devices 1100 in the memory system 1000 by summing up power consumption amounts of the nonvolatile memory devices 1100 coupled to the first to kth channels CH1 to CHk based on the first to kth power consumption signals PWRConsumption_CH1 to PWRConsumption_CHk respectively output from the first to kth channel power consumption management sections 7111 to 711k, and generate and output a total power consumption signal Tot_PWRConsumption_DIE corresponding to the derived total power consumption amount.

The processor 710 may further include a power budget set section 718. The power budget set section 718 may include information on the maximum power budget to be consumed by the memory system 1000. As an example, the power budget set section 718 may include information on the maximum power budget to be consumed by all of the nonvolatile memory devices 1100 in the memory system 1000, and generate and output a power budget signal PWR_Budget corresponding to the information on the maximum power budget. When the maximum power budget is imposed, it is necessary for the memory system 1000 to control the nonvolatile memory devices 1100 to operate within such budget set by the power budget set section 718.

The processor 710 may further include a system power management section 716. The system power management section 716 may derive a power consumption remaining value, which represents remaining and available amount of power for the nonvolatile memory devices 1100, based on the total power consumption signal Tot_PWRConsumption_DIE corresponding to the total amount of power consumed by the nonvolatile memory devices 1100, which is output from the power consumption sum-up section 715 and the power budget signal PWR_Budget corresponding to the maximum power budget available to all of the nonvolatile memory devices 1100, which is output from the power budget set section 718, and generate and output a power consumption remaining signal PWRConsumption_Remain corresponding to the power consumption remaining value.

As an example, the system power management section 716 may calculate the power consumption remaining value by subtracting the total amount of power consumed by the nonvolatile memory devices 1100, which is output from the power consumption sum-up section 715, from the maximum power budget to be consumed by all of the nonvolatile memory devices 1100, which is output from the power budget set section 718. As an example, when the total power consumption signal Tot_PWRConsumption_DIE corresponding to the total amount of power consumed by the nonvolatile memory devices 1100, which is output from the power consumption sum-up section 715, represents 450 mA, and the power budget signal PWR_Budget corresponding to the maximum power budget to be consumed by all of the nonvolatile memory device 1100, which is output from the power budget set section 718, represents 500 mA, the system power management section 716 may generate and output a power consumption remaining signal PWRConsumption_Remain representing 50 mA.

The processor 710 may further include a command scheduler 717. In addition, the command scheduler 717 may include a command queuing section 7171 and a command scan section 7172.

The command scheduler 717 may receive the read peak power signal PeakPWR_RD corresponding to the maximum power consumption amount of a read operation, the program peak power signal PeakPWR_PGM corresponding to the maximum power consumption amount of a program operation, the erase peak power signal PeakPWR_ERS corresponding to the maximum power consumption amount of an erase operation, the cache read peak power signal PeakPWR_CacheRD corresponding to the maximum power consumption amount of a cache read operation, and the cache program peak power signal PeakPWR_CachePGM corresponding to the maximum power consumption amount of a cache program operation.

The power consumption profile table storing section 714 may generate the read peak power signal PeakPWR_RD, the program peak power signal PeakPWR_PGM, the erase peak power signal PeakPWR_ERS, the cache read peak power signal PeakPWR_CacheRD, and the cache program peak power signal PeakPWR_CachePGM, sequentially based on the read power consumption profile table, the program power consumption profile table, the erase power consumption profile table, the cache read power consumption profile table, and the cache program power consumption profile table.

The command queuing section 7171 may queue a plurality of commands input from the host 2000 or a plurality of commands for a house keeping operation.

The command scan section 7172 may determine whether to release or hold a queued command based on the power consumption remaining signal PWRConsumption_Remain output from the system power management section 716, the read peak power signal PeakPWR_RD, the program peak power signal PeakPWR_PGM, the erase peak power signal PeakPWR_ERS, the cache read peak power signal PeakPWR_CacheRD, and the cache program peak power signal PeakPWR_CachePGM. The queued command may be released as a queue command signal Command_que.

As an example, when a value corresponding to the power consumption remaining signal PWRConsumption_Remain output from the system power management section 716 is 50 mA, and values corresponding to the read peak power signal PeakPWR_RD, the program peak power signal PeakPWR_PGM, the erase peak power signal PeakPWR_ERS, the cache read peak power signal PeakPWR_CacheRD, and the cache program peak power signal PeakPWR_CachePGM are 70 mA, 55 mA, 30 mA, 90 mA, and 80 mA, respectively, the command scan section 7172 may release one erase command among the queued commands. In this case, the command scan section 7172 may select an erase command by scanning the commands queued in the command queuing section 7171, and release the selected erase command. The erase command released from the command scan section 7172 may be transferred to the nonvolatile memory device 1100 through the flash interface 760 to be performed.

When a plurality of erase commands are queued in the command queuing section 7171 in the above-described example, the command scan section 7172 may select an erase command queued first among the queued erase commands and release the selected erase command.

As an example, when commands queued in the command queuing section 7171 are scanned, the command scan section 7172 may perform a command scan operation in an order of the commands from a command queued first, i.e., a command that is in a state in which it is queued for the longest time to commands queued posterior to the command, i.e., in the same direction as the order in which the commands are queued in the command queuing section 7171. In this case, when a plurality of erase commands are queued in the command queuing section 7171, the command scan section 7172 may select an erase command scanned first among the queued erase commands and release the selected erase command.

As another example, when a value corresponding to the power consumption remaining signal PWRConsumption_Remain output from the system power management section 716 is 60 mA, the command scan section 7172 may scan a program command or an erase command among the commands queued in the command queuing section 7171, and release the scanned command. As another example, the command scan section 7172 may select a command queued first among program or erase commands, queued by the command queuing section 7171, and release the selected command. As another example, when any one of at least one program command or at least one erase command is to be released, the command scan section 7172 may select a command queued first among commands having high orders of priority, and release the selected command. As an example, when the program command has a higher order of priority than the erase command, the command scan section 7172 may first scan the program command among the commands queued in the command queuing section 7171, and scan and release the erase command when there is no queued program command. In this case, when a plurality of program commands are queued in the command queuing section 7171, the command scan section 7172 may select a program command queued first among the plurality of program commands and release the selected program command. As another example, the command scan section 7172 may scan commands in an order of the commands from a first to a last queued command.

As an example, the read command may have the highest order of priority, the program command may have the next highest order of priority, and the erase command may have an order of priority just below that of the program command. As an example, the cache read command may have the same order of priority as the read command, and the cache program command may have the same order of priority as the program command.

As an example, when a value corresponding to the power consumption remaining signal PWRConsumption_Remain output from the system power management section 716 is 20 mA, and values corresponding to the read peak power signal PeakPWR_RD, the program peak power signal PeakPWR_PGM, the erase peak power signal PeakPWR_ERS, the cache read peak power signal PeakPWR_CacheRD, and the cache program peak power signal PeakPWR_CachePGM are 70 mA, 55 mA, 30 mA, 90 mA, and 80 mA, respectively, the command scan section 7172 does not release any command until the value corresponding to the power consumption remaining signal PWRConsumption_Remain becomes a certain level or more but may wait for a certain time.

As described above, the peak power consumed by the memory system 1000 can be managed to a certain level or less through a peak power management operation of the processor 710, and the degradation of performance of the memory system 1000 can be minimized.

Figure 11:
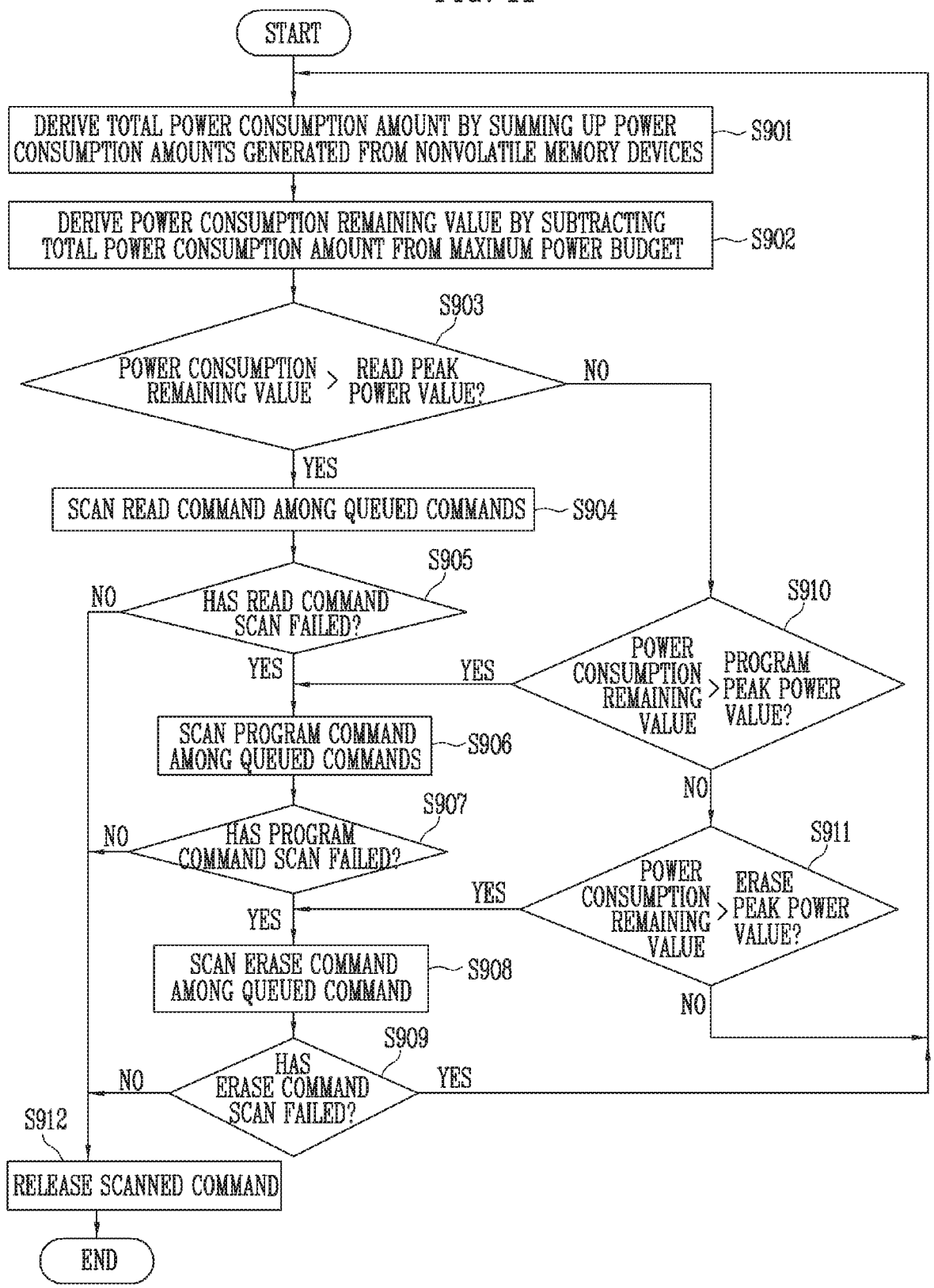
FIG. 11 is a flowchart illustrating a method for managing peak power according to an embodiment of the present disclosure.

FIG. 11 is a flowchart illustrating a method for managing peak power according to an embodiment of the present disclosure.

Referring to FIG. 11, as an example, a read peak power value generated when the nonvolatile memory device 1100 performs a read operation is greater than a program peak power value generated when the nonvolatile memory device 1100 performs a program operation, and the program peak power value is greater than an erase peak power value generated when the nonvolatile memory device 1100 performs an erase operation. In addition, the read operation may have the highest order of priority, the program operation may have the next highest order of priority, and the erase operation may have the lowest order of priority.

Under the above-described conditions, the processor 710 may derive the total power consumed by summing up power consumption amounts of the nonvolatile memory devices 1100 at step S901. Then, the processor 710 may derive a power consumption remaining value by subtracting the total power consumption amount from the maximum power budget at step S902.

When the power consumption remaining value is greater than a read peak power value ("YES" at step S903, the processor 710 may scan a read command having the highest order of priority among queued commands at step S904. A command scan operation may be performed in the order in which the commands are queued.

When the read command scan succeeds ("NO" at step S905), the scanned command may be released at step S912. In addition, the nonvolatile memory device 1100 may perform an internal operation, i.e., the read operation in response to the released command.

When the read command scan fails without any queued read command ("YES" at the step S905), the processor 710 may scan a program command having the next highest order of priority among the queued commands at step S906.

When the program command scan succeeds ("NO" at step S907), the scanned command may be released at step S912. In addition, the nonvolatile memory device 1100 may perform an internal operation, i.e., the program operation in response to the released command.

When the program command scan fails without any queued read command ("YES" at the step S907), the processor 710 may scan an erase command having the lowest order of priority among the queued commands at step S908.

When the erase command scan succeeds ("NO" at step S909), the scanned command may be released at step S912. In the nonvolatile memory device 1100 may perform an internal operation, i.e., the erase operation in response to the released command.

When the erase command scan fails without any queued erased command ("YES" at the step S909), the processor 710 may repeat steps S901 to S912.

When the power consumption remaining value is smaller than the read peak power value ("NO" at the step S903), the power consumption remaining value may be compared with the program peak power value. When the power consumption remaining value is greater than the program peak power value ("YES" at step S910), the step S906 may be performed.

When the power consumption remaining value is smaller than the program peak power value ("NO" at the step S910), the power consumption remaining value may be compared with the erase peak power value. When the power consumption remaining value is greater than the erase peak power value ("YES" at step S911), the step S908 may be performed. When the power consumption remaining value is smaller than the erase peak power value ("NO" at the step S911), the steps S901 to S912 may be repeated.

As an example, the steps S905, S910, and S911 may be simultaneously performed.

Figure 12:
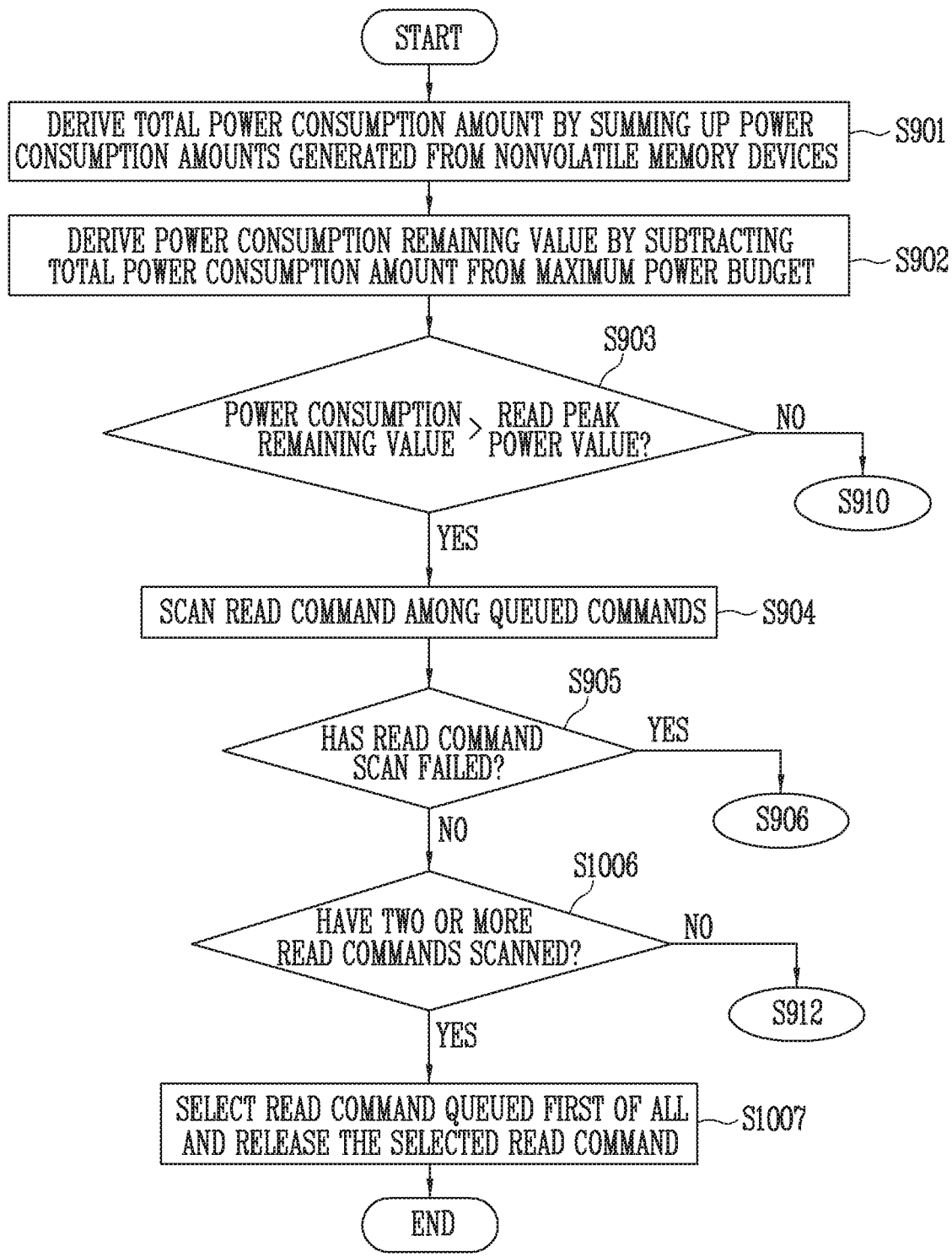
FIG. 12 is a flowchart illustrating a method for managing peak power according to another embodiment of the present disclosure.

FIG. 12 is a flowchart illustrating a method for managing peak power according to another embodiment of the present disclosure.

Referring to FIG. 12, as an example, a read peak power value generated when the nonvolatile memory device 1100 performs a read operation is greater than a program peak power value generated when the nonvolatile memory device 1100 performs a program operation, and the program peak power value is greater than an erase peak power value generated when the nonvolatile memory device 1100 performs an erase operation. In addition, the read operation may have the highest order of priority, the program operation may have the next highest order of priority, and the erase operation may have the lowest order of priority.

The processor 710 may derive a total power consumption amount by summing up power consumption amounts of the nonvolatile memory devices 1100 at step S901. Then, the processor 710 may derive a power consumption remaining value by subtracting the total power consumption amount from the maximum power budget at step S902.

When the power consumption remaining value is smaller than the read peak power value ("NO" at step 903), the step S910 of FIG. 11 may be performed.

When the power consumption remaining value is greater than the read peak power value ("YES" at the step S903), the processor 710 may scan a read command having the highest order of priority among queued commands at step S904.

When the read command scan fails ("YES" at step S905), the step S906 of FIG. 11 may be performed.

When the read command scan succeeds ("NO" at the step S905) and when one read command is scanned ("NO" at step S1006), the step S912 of FIG. 11 may be performed.

When two or more read commands are scanned ("YES" at the step S1006), the processor 710 may select a read command queued first and release the selected read command at step S1007.

In addition, the nonvolatile memory device 1100 may perform an internal operation, i.e., the read operation in response to the released command.

As another example, the processor 710 may select a program command queued first and release the selected program command even when a plurality of program commands are scanned in the step S906 of FIG. 11. Also, the processor 710 may select an erase command queued first and release the selected erase command even when a plurality of erase commands are scanned in the step S908 of FIG. 11.

Figure 13:
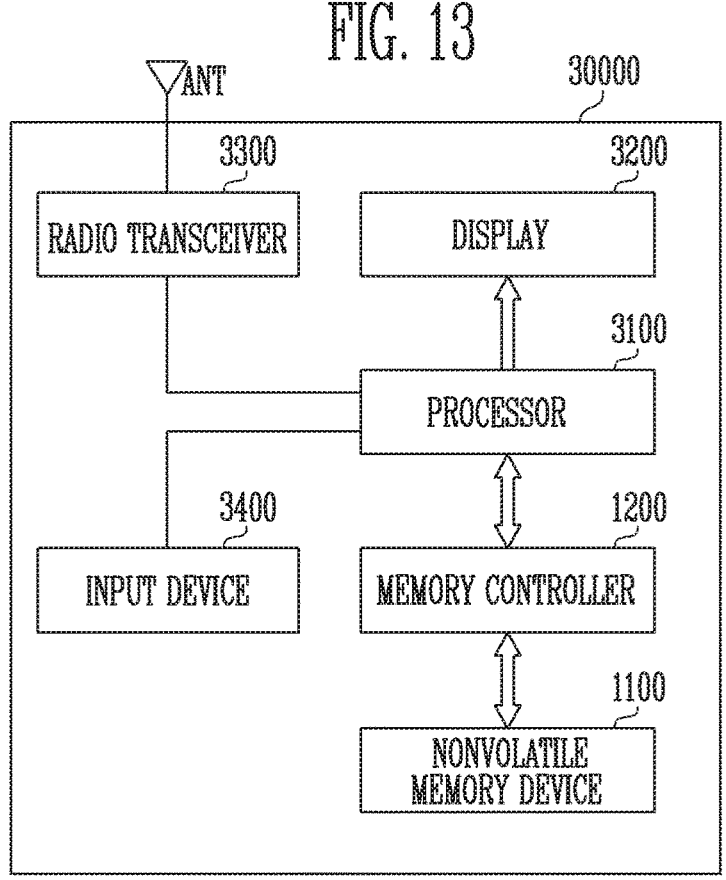
FIG. 13 is a diagram illustrating another embodiment of the memory system.

FIG. 13 is a diagram illustrating another embodiment of the memory system.

Referring to FIG. 13, the memory system 30000 may be implemented as a cellular phone, a smart phone, a tablet PC, a personal digital assistant (PDA), or a wireless communication device. The memory system 30000 may include a nonvolatile memory device 1100 and a memory controller 1200 capable of controlling an operation of the nonvolatile memory device 1100. The memory controller 1200 may control a data access operation of the nonvolatile memory device 1100, e.g., a program operation, an erase operation, or a read operation under the control of a processor 3100.

Data programmed in the nonvolatile memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may program the signal processed by the processor 3100 in the nonvolatile memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the nonvolatile memory device 1100 may be implemented as a part of the processor 3100, or be implemented as a chip separate from the processor 3100. Also, the memory controller 1200 may be implemented with the memory controller shown in FIG. 2.

Figure 14:
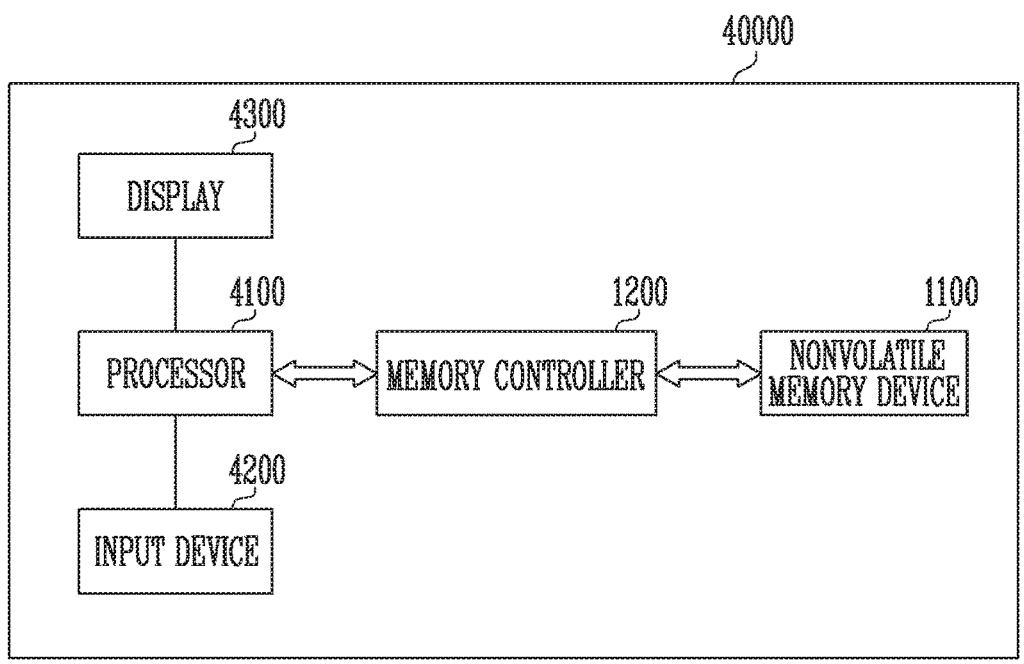
FIG. 14 is a diagram illustrating another embodiment of the memory system.

FIG. 14 is a diagram illustrating another embodiment of the memory system.

Referring to FIG. 14, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a nonvolatile memory device 1100 and a memory controller 1200 capable of controlling a data processing operation of the nonvolatile memory device 1100.

The processor 4100 may output data stored in the nonvolatile memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the nonvolatile memory device 1100 may be implemented as a part of the processor 4100, or be implemented as a chip separate from the processor 4100. Also, the memory controller 1200 may be implemented with the memory controller shown in FIG. 2.

Figure 15:
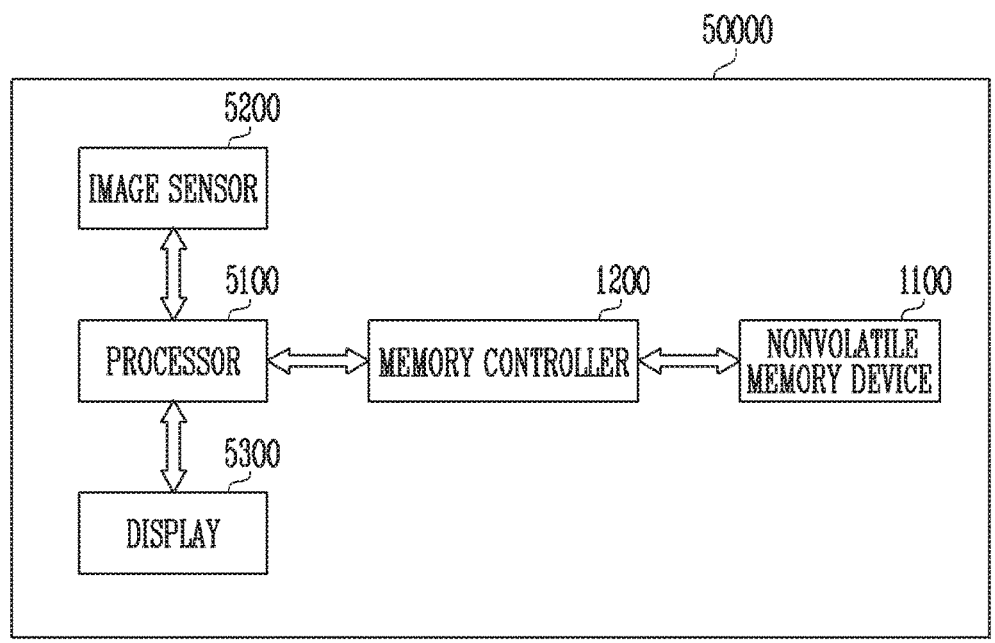
FIG. 15 is a diagram illustrating another embodiment of the memory system.

FIG. 15 is a diagram illustrating another embodiment of the memory system.

Referring to FIG. 15, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a nonvolatile memory device 1100 and a memory controller 1200 capable of controlling a data processing operation of the nonvolatile memory device 1100, e.g., a program operation, an erase operation, or a read operation.

An image sensor 5200 of the memory system 50000 may convert an optical image into digital signals, and the converted digital signals may be transmitted to the processor 5100 or the memory controller 1200. Under the control of the processor 5100, the converted digital signals may be output through a display 5300, or be stored in the nonvolatile memory device 1100 through the memory controller 1200. In addition, data stored in the nonvolatile memory device 1100 may be output through the display 5300 under the control of the processor 5100 or the memory controller 1200.

In some embodiments, the nonvolatile memory controller 1200 capable of controlling an operation of the nonvolatile memory device 1100 may be implemented as a part of the processor 5100, or be implemented as a chip separate from the processor 5100. Also, the memory controller 1200 may be implemented with the memory controller shown in FIG. 2.

Figure 16:
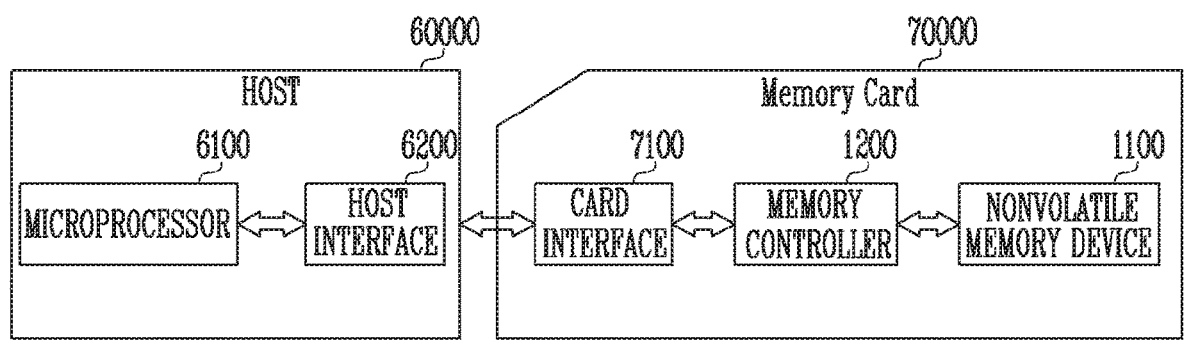
FIG. 16 is a diagram illustrating another embodiment of the memory system.

FIG. 16 is a diagram illustrating another embodiment of the memory system.

Referring to FIG. 16, the memory system 70000 may be implemented as a memory card or a smart card. The memory system 70000 may include a nonvolatile memory device 1100, a memory controller 1200, and a card interface 7100.

The memory controller 1200 may control data exchange between the nonvolatile memory device 1100 and the card interface 7100. In some embodiments, the card interface 7100 may be a secure digital (SD) card interface or a multi-media card (MMC) interface, but the present disclosure is not limited thereto. Also, the memory controller 1200 may be implemented with the memory controller shown in FIG. 2.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the nonvolatile memory device 1100 through the card interface 7100 and the memory controller 1200 under the control of a microprocessor 6100.

In the memory system according to embodiments of the present disclosure, it is determined whether a queued command is to be performed or held in the queue for longer so as to manage a large amount of peak power generated by nonvolatile memory devices. As a result, the reliability of the memory system can be improved, and the degradation of performance of the memory system can be minimized.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
    a plurality of memory devices configured to perform operations which have different orders of priority;
    a power consumption profile table storing circuit configured to store a plurality of power consumption profile tables respectively corresponding to the operations; and
    a processor configured to derive a power consumption remaining value based on the power consumption profile tables and a predetermined maximum power budget, to scan at least one queued command corresponding to a peak power value equal to or less than the power consumption remaining value among peak power values included in the power consumption profile tables, to release a queued command corresponding to a first operation having the highest order of priority in response to a success of the scan of the queued command corresponding to the first operation, and to release a queued command corresponding to a second operation having a next highest order of priority in response to a failure of the scan of the queued command corresponding to the first operation,
    wherein each of the power consumption profile tables includes power consumption values which indicate required power consumption in a predetermined time unit from a time an operation starts to a time the operation ends.

2. The memory system of claim 1,
    wherein the plurality of power consumption profile tables include a read power consumption profile table and a program power consumption profile table,
    wherein the read power consumption profile table includes power consumption values of a read operation selected at a first time interval,
    wherein the program power consumption profile table includes power consumption values of a program operation selected at a second time interval, and
    wherein the first time interval is different from the second time interval.

3. The memory system of claim 2, further comprising:
    a read time interval management circuit configured to output a read notification signal at the first time interval; and
    a program time interval management circuit configured to output a program notification signal at the second time interval.

4. The memory system of claim 1, wherein the processor further includes:
    a flash power consumption management circuit configured to derive unit power consumption values for the respective memory devices that perform the operations based on the plurality of power consumption profile tables; and
    a power consumption sum-up circuit configured to derive a total power consumption value by summing up the unit power consumption values.

5. The memory system of claim 4, wherein the processor further includes:
    a command queuing circuit configured to queue a plurality of commands; and
    a command scan circuit configured to scan the at least one queued command corresponding to the peak power value equal to or less than the power consumption remaining value among the plurality of the commands based on the total power consumption value, to release the queued command in response to the success of the scan of the queued command corresponding to the first operation, and to release the queued command in response to the failure of the scan of the queued command corresponding to the first operation,
    wherein the first operation is a read operation, and
    wherein the second operation is a program operation.

6. The memory system of claim 5, wherein the processor further includes:
    a power budget set circuit configured to set the maximum power budget of the memory system; and a system power management circuit configured to derive the power consumption remaining value based on the maximum power budget and the total power consumption value.

7. The memory system of claim 6, wherein the command scan circuit selects a command corresponding to any one of the operations by comparing peak power values of the operations in the power consumption profile tables with the power consumption remaining value.

8. The memory system of claim 7,
wherein the command queuing circuit sequentially queues the plurality of commands, and
wherein the command scan circuit scans the plurality of commands in the order in which the plurality of commands are queued.

9. The memory system of claim 7, wherein the command scan circuit waits for an operation of scanning the plurality of commands when the power consumption remaining value is smaller than the peak power values.

10. The memory system of claim 5,
wherein the plurality of memory devices include first memory devices coupled to a first channel and second memory devices coupled to a second channel,
wherein the first memory devices and the second memory devices perform different operations, and
wherein the flash power consumption management circuit includes a first channel power consumption management circuit and a second channel power consumption management circuit,
wherein the first channel power consumption management circuit derives a first power consumption value for the first memory devices based on an operation performed by the first memory devices, data corresponding to the operation performed by the first memory devices in the power consumption profile tables, and the number of the first memory devices, and
wherein the second channel power consumption management circuit derives a second power consumption value for the second memory devices based on an operation performed by the second memory devices, data corresponding to the operation performed by the second memory devices in the power consumption profile tables, and the number of the second memory devices.

11. The memory system of claim 10,
wherein the plurality of memory devices further include third memory devices coupled to a third channel,
wherein the power consumption sum-up circuit derives the total power consumption value by summing up the first power consumption value and the second power consumption value, and
wherein, when the third memory devices are in an idle state, the command scan circuit releases the selected command to the third memory devices based on the total power consumption value.

12. A method for operating a memory system, the method comprising:
deriving a total power consumption value by summing up power consumption values for memory devices that perform operations which have different orders of priority, based on a plurality of power consumption profile tables representing power consumption values which change with respect to times of the operations;
deriving a power consumption remaining value by subtracting the total power consumption value from a maximum power budget;
comparing peak power values of the operations with the power consumption remaining value; and
determining whether a command scan operation of scanning queued commands is to be performed or held, based on the compared result,
wherein the command scan operation includes a first selection phase, and a second selection phase,
wherein the first selection phase includes selecting a command corresponding to an operation having the highest order of priority among the queued commands, in response to the power consumption remaining value greater than the peak power values, and releasing the command corresponding to the operation having the highest order of priority, and
wherein the second selection phase includes selecting a command corresponding to an operation having a next highest order of priority among the queued commands, and releasing the command corresponding to the operation having the next highest order of priority in response to a failure of the command selection in the first selection phase.

13. The method of claim 12, wherein the command scan operation selects a command queued first among commands corresponding to an operation having a peak power value smaller than the power consumption remaining value.

14. The method of claim 12,
wherein the power consumption profile tables include a read power consumption profile table and a program power consumption profile table,
wherein the read power consumption profile table includes data obtained by selecting a power consumption value generated when at least one of the memory devices performs a read operation at a first time interval,
wherein the program power consumption profile table includes data obtained by selecting a power consumption value generated when at least one of the memory devices performs a program operation at a second time interval, and
wherein the first time interval is smaller than the second time interval.

15. The method of claim 14, further comprising:
generating a read notification signal including pulses generated at the first time interval; and
generating a program notification signal including pulses generated at the second time interval,
wherein the deriving of the total power consumption value is performed in response to the pulses of the read notification signal or the program notification signal.

* * * * *